US009648528B2

(12) United States Patent
Lee et al.

(10) Patent No.: US 9,648,528 B2
(45) Date of Patent: May 9, 2017

(54) METHOD AND APPARATUS FOR SUPPORTING HANDOVER OVER INTERNET

(71) Applicant: Samsung Electronics Co., Ltd, Gyeonggi-do (KR)

(72) Inventors: Chul-Ki Lee, Seoul (KR); Sang-Jun Moon, Seoul (KR); Yong-Seok Park, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 254 days.

(21) Appl. No.: 14/019,268

(22) Filed: Sep. 5, 2013

(65) Prior Publication Data
US 2014/0064249 A1 Mar. 6, 2014

(30) Foreign Application Priority Data

Sep. 5, 2012 (KR) ......................... 10-2012-0098172

(51) Int. Cl.
*H04W 36/00* (2009.01)
*H04W 36/02* (2009.01)

(52) U.S. Cl.
CPC ..... *H04W 36/023* (2013.01); *H04W 36/0033* (2013.01); *H04W 36/02* (2013.01); *H04W 36/0016* (2013.01)

(58) Field of Classification Search
None
See application file for complete search history.

(56) References Cited

U.S. PATENT DOCUMENTS 6,823,377 B1 * 11/2004 Wu .................. G06F 17/30902
707/E17.12
8,111,630 B2    2/2012 Kovvali et al.
(Continued)

FOREIGN PATENT DOCUMENTS

WO   WO 2009/021214 A2    2/2009
WO   WO 2010/050758 A2    5/2010
WO   WO 2010/151193 A1    12/2010

OTHER PUBLICATIONS

Rajiv Chakravorty, et al., "Using TCP Flow-Aggregation to Enhance Data Experience of Cellular Wireless Users", IEEE Journal on Selected Areas in Communications, vol. 23, No. 6, Jun. 2005, p. 1190-1204.
(Continued)

*Primary Examiner* — Chirag Shah
*Assistant Examiner* — Jenkey Van

(57) ABSTRACT

A method and apparatus for supporting a handover through the Internet. A source proxy performs receiving, through an eNB from a UE, a connection request to a server, establishing a first TCP session with an anchor proxy designated for the server, and transferring data received from the server through the first TCP session, receiving a handover preparation notification including an IP address of the UE from the eNB, as the UE is handed over to a target eNB; transferring session information associated with the first TCP session and information associated with a target proxy related with the target base station; transferring, to the target proxy, the session information associated with the first TCP session, and when a handover start notification is received from the eNB, freezing the first TCP session, and transferring, to the target proxy, state information associated with data being transmitted through the first TCP session.

11 Claims, 20 Drawing Sheets

(56) References Cited

U.S. PATENT DOCUMENTS

| | | | |
|---|---|---|---|
| 2008/0310365 A1* | 12/2008 | Ergen | H04W 36/02 |
| | | | 370/331 |
| 2010/0202407 A1 | 8/2010 | Edge | |
| 2011/0136488 A1* | 6/2011 | Kuvvali | H04W 36/08 |
| | | | 455/436 |
| 2012/0051321 A1 | 3/2012 | De et al. | |
| 2012/0102140 A1* | 4/2012 | Nadas | H04L 43/0888 |
| | | | 709/213 |
| 2012/0164979 A1 | 6/2012 | Bachmann et al. | |
| 2012/0300747 A1* | 11/2012 | Westberg | H04W 36/0011 |
| | | | 370/331 |

OTHER PUBLICATIONS

Ole J. Jacobsen, "The Internet Protocol Journal", vol. 13, No. 3, Sep. 2010, 32 pages.
International Search Report dated Nov. 29, 2013 in connection with International Patent Application No. PCT/KR2013/007961.
Extended European Search Report dated Apr. 19, 2016 in connection with European Application No. 13835052.5, 11 pages.

* cited by examiner

METHOD AND APPARATUS FOR SUPPORTING HANDOVER OVER INTERNET

CROSS-REFERENCE TO RELATED APPLICATION(S) AND CLAIM OF PRIORITY

The present application is related to and claims the priority under 35 U.S.C. §119(a) to Korean Application Serial No. 10-2012-0098172, which was filed in the Korean Intellectual Property Office on Sep. 5, 2012, the entire content of which is hereby incorporated by reference.

TECHNICAL FIELD

The present disclosure relates generally to Internet communication, and more particularly, to a method and apparatus for supporting mobility of a User Equipment (UE) on the Internet.

BACKGROUND

The Internet and the World Wide Web (WWW) have dramatically developed and thus, data transmission schemes using a cable, a Digital Subscriber Line (DSL), and various wired broadband networks have been required. It is difficult to satisfy an explosive increase of data traffic by merely mirroring or replicating a few sites located in different geographical positions Therefore, to satisfy demands associated with a bandwidth, to decrease a load on a server, and to improve a user response time, a technology that stores a content in a cache has been developed. A web caching may store copies of web documents such as a web page, an image, a picture, other multimedia entities, in dispersed caches, and a cache that satisfies a predetermined condition may process a request for web content.

In a cellular communication system that divides an entire service area into a plurality of cells and covers the cells by respective base stations (Node Bs or base stations), the base stations may generally connect to the Internet through a core network provided by a provider of the cellular communication system. Recently, a technology that includes a proxy cache in the entirety or a few of the base stations for a faster internet connection, and enables an immediate connection to the Internet through the proxy cache, has been developed. As described above, a base station that includes a proxy cache is referred to as an advanced wireless node.

A User Equipment (UE), such as a smart phone that has a Transport Control Protocol (TCP) connection function, a tablet computer or a notebook that includes a communication module, and the like, may be connected to the Internet by an advanced wireless node through a core network, or may be directly connected to the Internet by a proxy cache. The proxy caches included in the base stations may form a network, mutually.

A wireless communication system such as a cellular communication system may secure mobility describing that a UE freely moves among various wireless nodes. Conventionally, a handover associated with a movement of a UE may be supported by a core network provided by a provider of the wireless communication system. In general, the core network requires a higher cost and provides a slower speed when compared to the Internet. Therefore, there is a desire for a technology that provides an Internet connection without an existing core network and supports a handover of a UE when the proxy caches form a network.

SUMMARY

To address the above-discussed deficiencies of the prior art, it is a primary object to provide a method and an apparatus for transmitting and receiving information in a communication system.

Another aspect of the present disclosure is to provide a method and apparatus for supporting a handover of a User Equipment (UE) in an Internet level through proxy caches disposed in enhanced Node Bs (eNBs) in a communication system.

Another aspect of the present disclosure is to provide a method and apparatus for a UE to perform a handover in a state in which the UE is connected to the Internet without using a network of a provider.

Another aspect of the present disclosure is to provide a method and apparatus for supporting a handover of a UE through the Internet which is relatively inexpensive as opposed to using a backhaul network of a provider of which a connection cost is expensive.

Another aspect of the present disclosure is to provide a method and apparatus for supporting mobility of a UE by performing a handover through a network among proxies so as to offload traffic to the Internet.

In accordance with another aspect of the present disclosure, a method of supporting a handover through the Internet is provided. The method includes: receiving, through an eNB from a UE, a connection request to a server; establishing a first Transport Control Protocol (TCP) session with an anchor proxy designated for the server, and transferring, to the UE, data received from the server through the first TCP session; receiving a handover preparation notification including an IP address of the UE from the eNB, as the UE is handed over to a target eNB; transferring, to the anchor proxy, session information associated with the first TCP session and information associated with a target proxy related with the target base station; transferring, to the target proxy, the session information associated with the first TCP session; and when a handover start notification is received from the eNB, freezing the first TCP session, and transferring, to the target proxy, state information associated with data that is being transmitted through the first TCP session.

In accordance with another aspect of the present disclosure, a method of supporting a handover through the Internet is provided. The method includes: connecting a first TCP session with a source proxy, and transferring data received from a server to a UE connected to the source proxy through the first TCP session; receiving, from a source eNB, session information associated with the first TCP session and information associated with the target proxy, as the UE is handed over from the source proxy to a target proxy; freezing the first TCP session, and establishing a second TCP with the target proxy; sharing, with the target proxy, session information associated with the first TCP session and the second TCP session; and transferring data received from the server to a UE connected to the target proxy through the second TCP session when a handover complete notification is received from the target proxy.

In accordance with another aspect of the present disclosure, a method of supporting a handover through the Internet is provided. The method includes: receiving, from a source proxy, information associated with a UE to be handed over; receiving, from the source proxy, session information associated with a first TCP established between the source proxy and an anchor proxy designated for a server that stores a content to be provided to the UE; establishing a second TCP session with the anchor proxy; transferring, to the anchor proxy, mapping information between the first TCP session and the second TCP session; receiving, from the source proxy, a context associated with the first TCP session; and receiving, from the source proxy, state information associated with data that is being transmitted through the first TCP session.

In accordance with another aspect of the present disclosure, a proxy apparatus that supports a handover through the Internet is provided. The proxy apparatus includes: a transmitting unit; a receiving unit; and a controller that controls the transmitting unit and the receiving unit. The controller performs: receiving, through an eNB from a UE, a connection request to a server; establishing a first TCP session with an anchor proxy designated for the server, and transferring, to the UE, data received from the server through the first TCP session; receiving a handover preparation notification including an IP address of the UE, from the eNB, as the UE is handed over to a target eNB; transferring, to the anchor proxy, session information associated with the first TCP session and information associated with a target proxy related with a target eNB; transferring, to the target proxy, the session information associated with the first TCP session; and freezing the first TCP session and transferring, to the target proxy, state information associated with data being transmitted through the first TCP session when a handover start notification is received from the eNB.

In accordance with another aspect of the present disclosure, a proxy apparatus for supporting a handover through the Internet is provided. The proxy apparatus includes: a transmitting unit; a receiving unit; and a controller that controls the transmitting and the receiving unit. The controller performs: connecting a first TCP session with a source proxy, and transferring data received from a server to a UE connected to the source proxy through the first TCP session; receiving, from a source eNB, session information associated with the first TCP session and information associated with a target proxy, as the UE is handed over from the source proxy to the target proxy; freezing the first TCP session, and establishing a second TCP session with the target proxy; sharing, with the target proxy, session information associated with the first TCP session and the second TCP session; and transferring data received from the server to a UE connected to the target proxy through the second TCP session when a handover complete notification is received from the target proxy.

In accordance with another aspect of the present disclosure, a proxy apparatus for supporting a handover through the Internet is provided. The proxy apparatus includes: a transmitting unit; a receiving unit; a controller that controls the transmitting unit and the receiving unit. The controller performs: receiving, from a source proxy, information associated with a UE to be handed over; receiving, from the source proxy, session information associated with a first TCP connected between the source proxy and an anchor proxy designated for a server that stores a content to be provided to the UE; establishing a second TCP session with the anchor proxy; transferring, to the anchor proxy, mapping information between the first TCP session and the second TCP session; receiving, from the source proxy, a context associated with the first TCP session; and receiving, from the source proxy, state information associated with data that is being transmitted through the first TCP session.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, various embodiments of the present disclosure will be described with reference to the accompanying drawings. Further, in the following description of the present disclosure, a detailed description of known functions and configurations incorporated herein will be omitted when it may make the subject matter of the present disclosure rather unclear. Then, terms described later are defined in consideration of the functions of the present disclosure, but may vary according to the intention or convention of a user or operator. Therefore, its definition will be made based on the overall contents of this specification.

Figure 1:
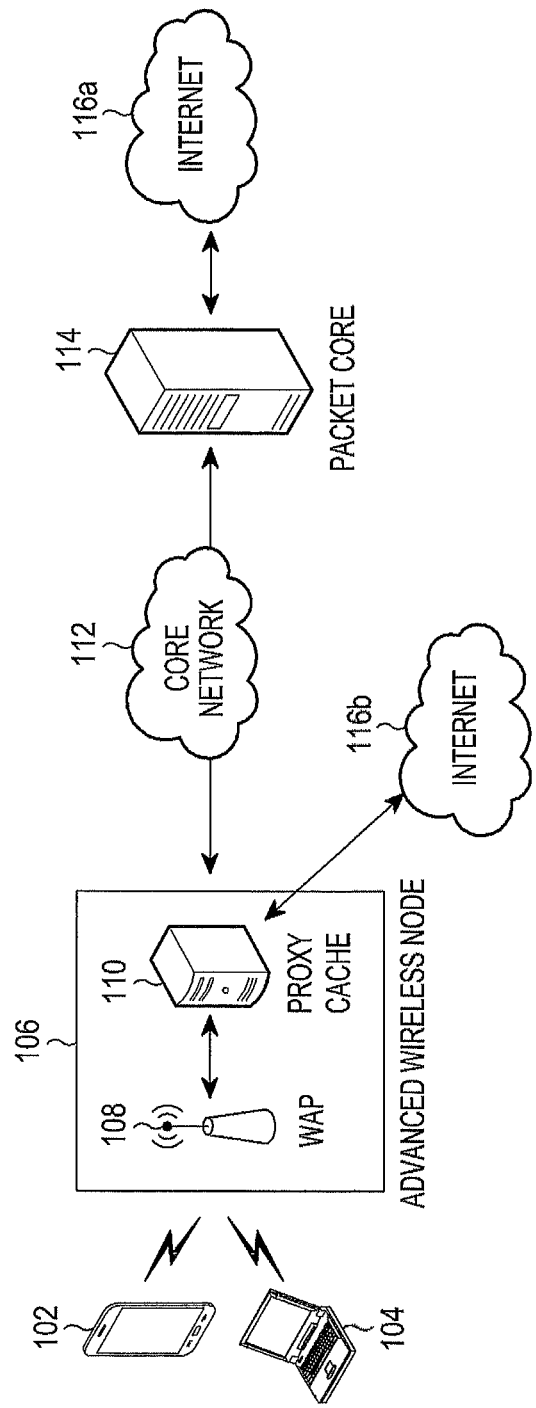
FIG. 1 illustrates a structure of a wireless communication system that connects to the Internet through a proxy cache.

FIG. 1 illustrates a structure of a wireless communication system that connects to the Internet through a proxy cache.

Referring to FIG. 1, a User Equipment (UE), such as a smart phone 102 and a notebook computer 104, may wirelessly connect to an advanced wireless node 106. The advanced wireless node 106 may be formed of a Wireless Access Point (WAP) 108 which is a representative wireless node and a proxy cache 110 that supports connection to the Internet. The WAP 108 may be embodied as an enhanced Node B (eNB) or a Base Station (BS). The proxy cache 110 may be included in the advanced wireless node 106, or may be separately included and logically connected to the WAP 108.

UEs 102 and 104 may connect to the wireless node 106 through wireless communication, and the proxy cache 110 may provide the UEs 102 and 104 with a proxy service from a perspective of a Transport Control Protocol (TCP). The proxy cache 110 may provide a proxy service from a perspective of another layer 4, for example, SCTP (Stream Control Transmission Protocol), UDP (User Datagram Protocol), and tunneling. The proxy cache 110 may connect to the Internet 116a through a core network and a packet core system 114 provided by a provider of the wireless communication system or may directly connect to the Internet 116b.

Figure 2:
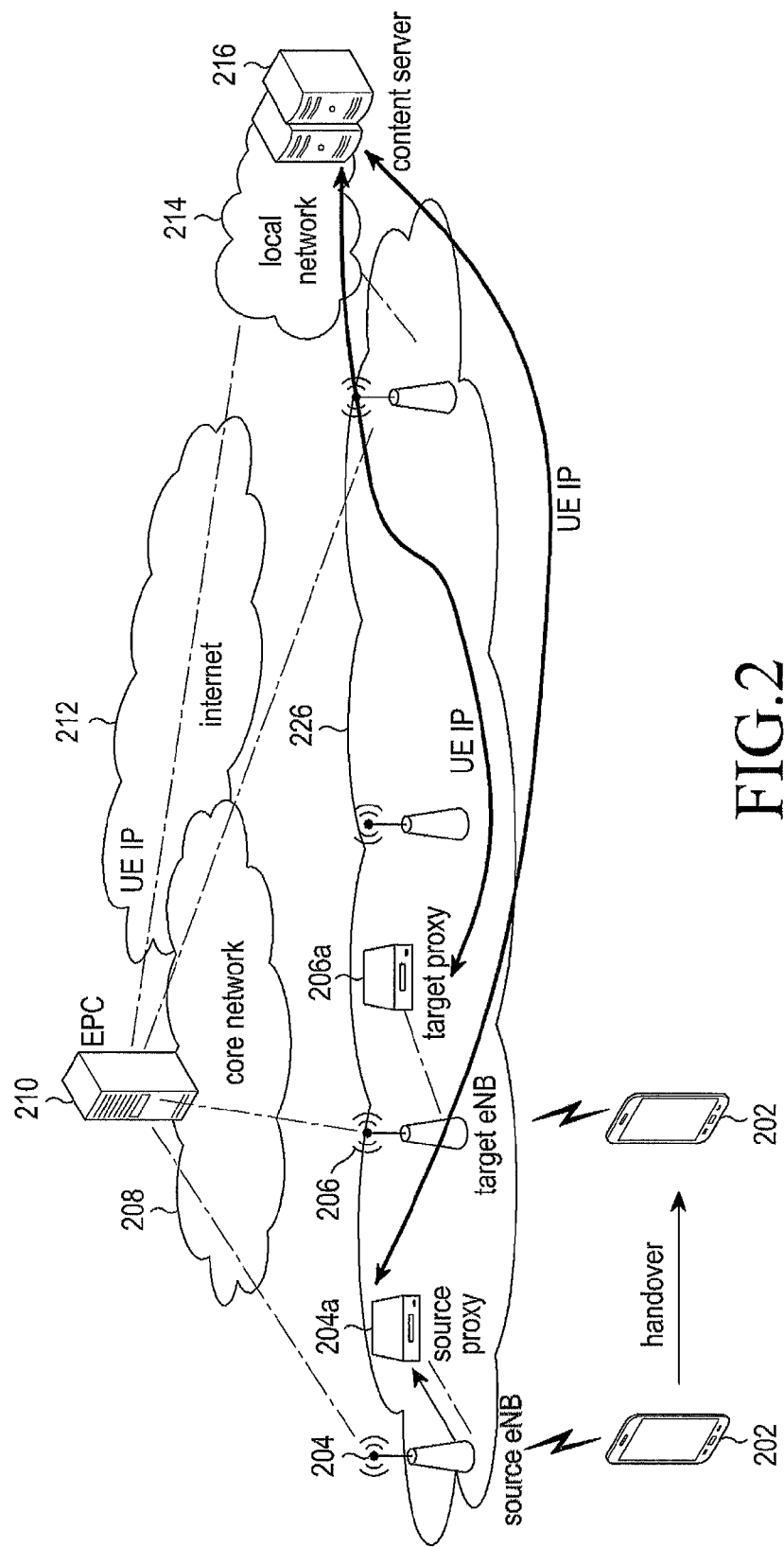
FIG. 2 conceptually illustrates a handover procedure according to an embodiment of the present disclosure.

FIG. 2 conceptually illustrates a handover procedure according to an embodiment of the present disclosure. Here, a case in which a WAP is embodied as an eNB has been illustrated.

Referring to FIG. 2, a User Equipment (UE) 202 may request an establishment of a wireless connection with a source eNB 204. An Evolved Packet Core (EPC) 210 in a core network 208 may transmit packets from the UE 202 to a content server 216 located in a local network through the Internet 212 when the UE 202 requests an Internet service through the source eNB 204. In this case, the packets may be routed using an IP address of the UE 202, that is, a UE IP. A similar procedure may be applied when the UE 202 performs TCP communication with another UE (not illustrated), as opposed to with the content server 216.

When a proxy service is supported, the packets from the UE 202 may be transferred to a source proxy 204a using the IP address of the UE 202, that is, the UE IP. A source IP address of the packets that are originated from the UE 202 and output from the source proxy 204a may be set to an IP address of the source proxy 204a, and may be transferred through a TCP connection with the content server 216.

When the UE 202 moves to a target eNB 206, a TCP connection between the UE 202 and the source proxy 204a may migrate into a TCP connection between the UE 202 and a target proxy 206b. Then, the source IP address of packets output from the target proxy 206b may be set to an IP address of the target proxy 206a. When the source IP address is changed as described above, the existing TCP session is disconnected from the content server 216.

An embodiment of the present disclosure may provide a procedure that smoothly performs a handover from the existing TCP session of the source proxy 204a to a new TCP session in the target proxy 206a. In particular, an embodiment of the present disclosure operates a proxy cache of an advanced wireless node located near the content server 216, for example, located in a place geographically close to the content server 216, as an anchor proxy for a handover of a UE.

Figure 3:
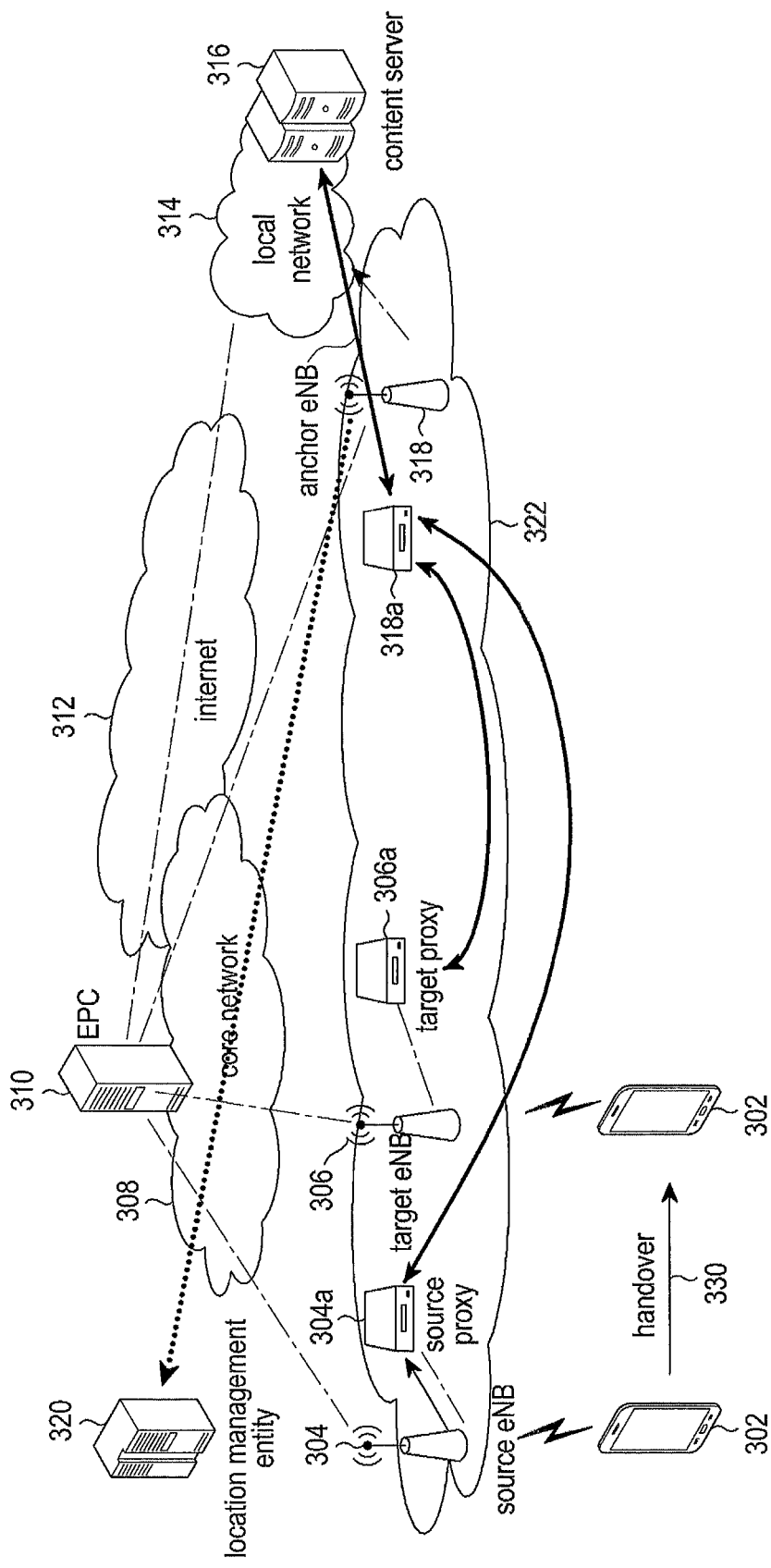
FIG. 3 illustrates a procedure of maintaining a session through an anchor proxy according to an embodiment of the present disclosure.

FIG. 3 illustrates a procedure that maintains a session through an anchor proxy according to an embodiment of the present disclosure.

Referring to FIG. 3, a UE 302 may establish a wireless connection with a source eNB 304. An EPC 310 in a core network 308 may transmit packets from the UE 302 to a content server 316 located in a local network through the Internet 312 when the UE 302 requests an Internet service through the source eNB 304. Even in a case in which the UE 302 moves to a target eNB 306, the EPC 310 may recognize that the UE 302 connects to the target eNB 306 based on a location management entity 320 of a wireless communication system, and may maintain the Internet connection of the UE 302.

When a proxy service is supported, the packets from the UE 302 may be transferred to a source proxy 304a using an IP address of the UE 302, that is, a UE IP. A source IP address of the packets originated from the UE 302 and output from the source proxy 304a is set to an IP address of the source proxy 304a, and may be transferred to an anchor proxy 318a of an anchor eNB 318. The anchor proxy 318a may transfer the packets to the content server 316 of a local network 314. Here, the anchor eNB 318 may indicate an advanced wireless node designated as an anchor for the content server 316, and may be managed by, for example, a server of a wireless communication network. That is, the management server of the wireless communication network may designate an anchor node having a proxy cache for a few of the content servers on the Internet, and manages an IP address thereof. For the anchor node, for example, a node that is close to a corresponding content server, geographically or in terms of a communication link, and is managed by the wireless communication network, may be selected.

When the UE 302 moves to a location in the target eNB 306 and a handover 330 occurs, a TCP connection between the UE 302 and the source proxy 304a may migrate into a TCP connection between the UE 302 and a target proxy 306a. The source proxy 304a, the target proxy 306a, and the anchor proxy 318a may form a network 322. A source IP address of the packets originated from the UE 302 and output from the target proxy 306*a* may be set to an IP address of the target proxy 306*a*, and may be transferred to the anchor proxy 318*a* of the anchor eNB 318. The anchor proxy 318*a* may set the source IP address of the packets to an IP address of the anchor proxy 318*a*, and may transfer the same to the content server 308 of the local network 314. The source IP address of the packets entered into the content server 308 may be always set to the IP address of the anchor proxy 318*a*, irrespectively of a movement of the UE 302. Therefore, when a TCP connection associated with the UE 302 may be maintained in the content server 308, regardless of a movement of the UE 302. That is, although a handover occurs, the content server 308 may not recognize the movement of the UE 302.

Figure 4:
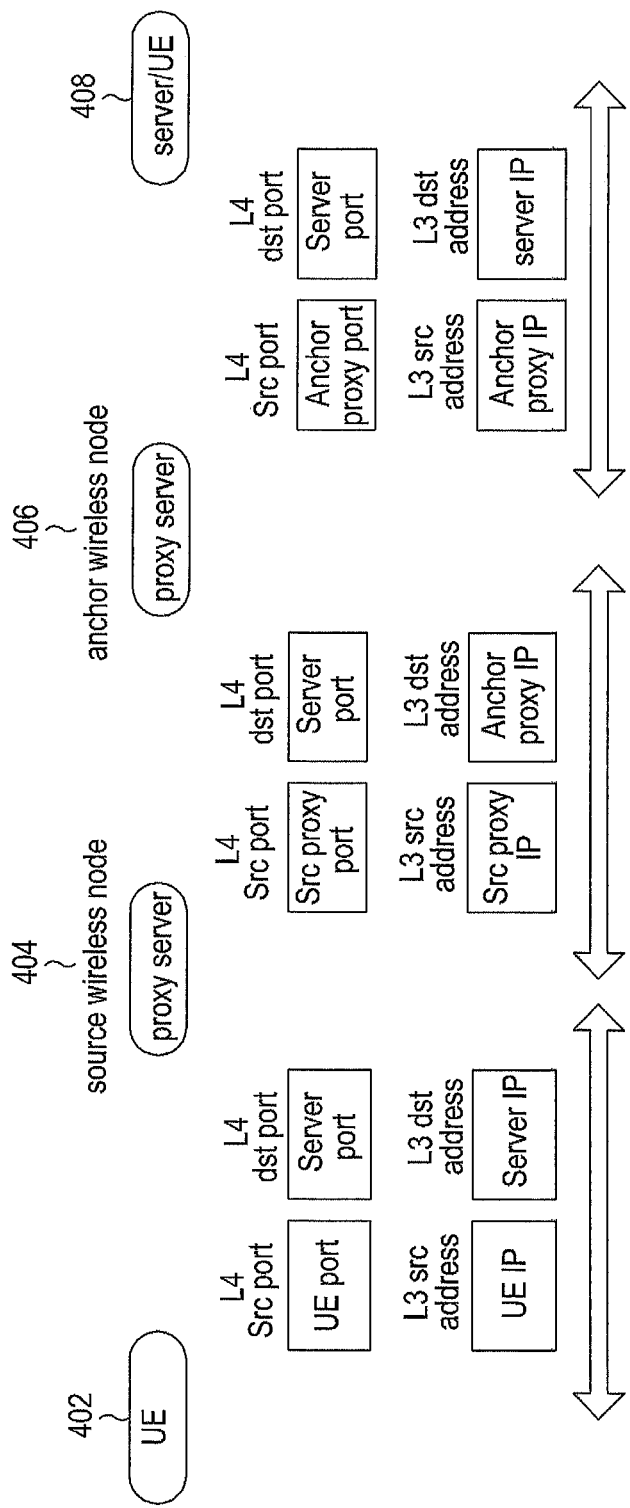
FIG. 4 illustrates conversion in each connection according to an embodiment of the present disclosure.

FIG. 4 illustrates conversion in each connection according to an embodiment of the present disclosure. Here, conversion of an IP address for a layer 3 communication and conversion of a port number for a layer 4 communication will be described.

Referring to FIG. 4, a UE 402 sets a source address and a port number of a packet to be transmitted, to a UE IP and a UE port, respectively, and sets a destination address and a port number to a server IP and a server port, respectively. A source proxy cache of a source wireless node, that is, a source proxy 404, is transparent with respect to the UE 402 and thus, may receive packets originated from the UE 402. The source proxy 404 changes a source address and a port number of a packet transferred from the UE 402 into an IP address and a port number of the source proxy 404, respectively, and changes a destination address and a port number into an IP address of an anchor proxy cache of an anchor wireless node, that is, an anchor proxy 406, and a port number of a content server 408, respectively.

As another embodiment, the source proxy 404 may set a destination port number of a packet transferred to the anchor proxy 406 to a port number of the anchor proxy 406, and when the anchor proxy 406 transfers a received packet to the content server 408, the anchor proxy 406 may estimate a port number based on previously stored information (for example, a server port number that the UE 402 initially transmits, a type of protocol, or the like), and re-write the same on the packet.

The anchor proxy 406 changes a source address and a port number of a packet that is originated from the UE 402 and is transferred from a source proxy into an IP address and a port number of the anchor proxy 406, respectively, and changes a destination address and a port number into an IP address and a port number of the content server 408. A similar procedure may be applied to packet transmission in a reverse direction.

When the UE 402 moves and connects to a target wireless node (not illustrated), as opposed to a source wireless node, a target proxy of the target wireless node changes a source address and a port number of packets received from the UE 402 into an IP address and a port number of the target proxy, and changes a destination address and a port number into an IP address of the anchor proxy 406 and a port number of the content server 408. Packets output from the target proxy may be transferred to the anchor proxy 406 based on the destination address. As described above, the content server 408 may always perform communication with the UE 402 through the anchor proxy 406 and thus, a TCP connection between the content server 408 and the anchor proxy 406 may not be migrated and may be maintained, irrespectively of a movement of the UE 402.

Figure 5:
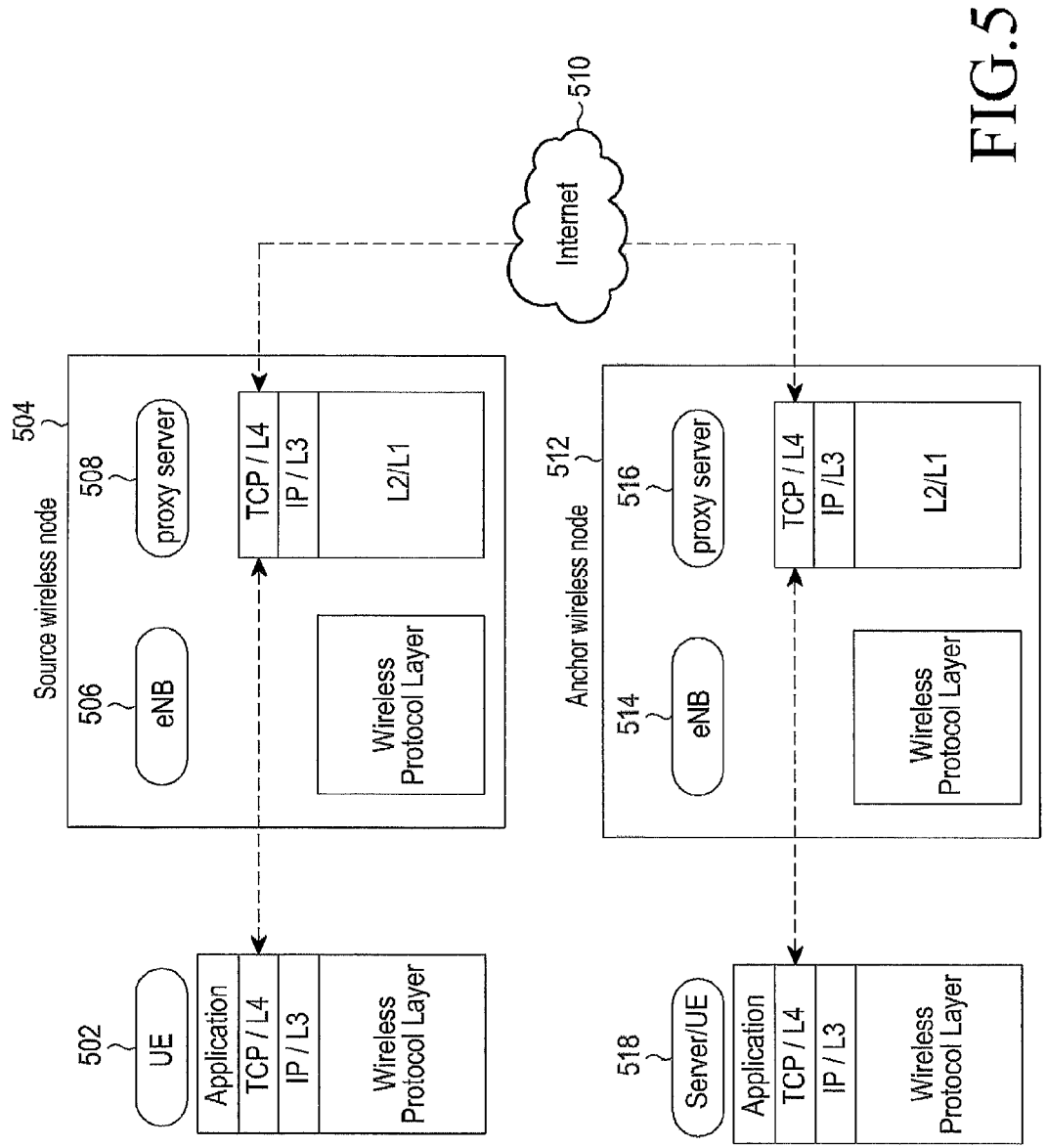
FIG. 5 illustrates a protocol connection of a plurality of advanced wireless nodes according to an embodiment of the present disclosure.

FIG. 5 illustrates a protocol connection of a plurality of advanced wireless nodes according to an embodiment of the present disclosure.

Referring to FIG. 5, a protocol stack of a UE 502 and a content server 518 is formed of a wireless protocol layer associated with a wireless communication system, an IP layer, a TCP layer, and an application layer. An eNB 506 or 514 of a wireless node 504 and 512 may include only a wireless protocol layer, and a proxy 508 and 516 may include L2/L1 layers, an IP layer, and a TCP layer for a physical/link connection with the Internet 510.

A TCP connection based on a layer 4 port number exists between the UE 502 and a source proxy 508 of the source wireless node 504, a TCP connection through the Internet 510 exists between the source proxy 508 and the anchor wireless node 512, and a TCP connection exists between the anchor proxy 516 and the content server 518.

Figure 6:
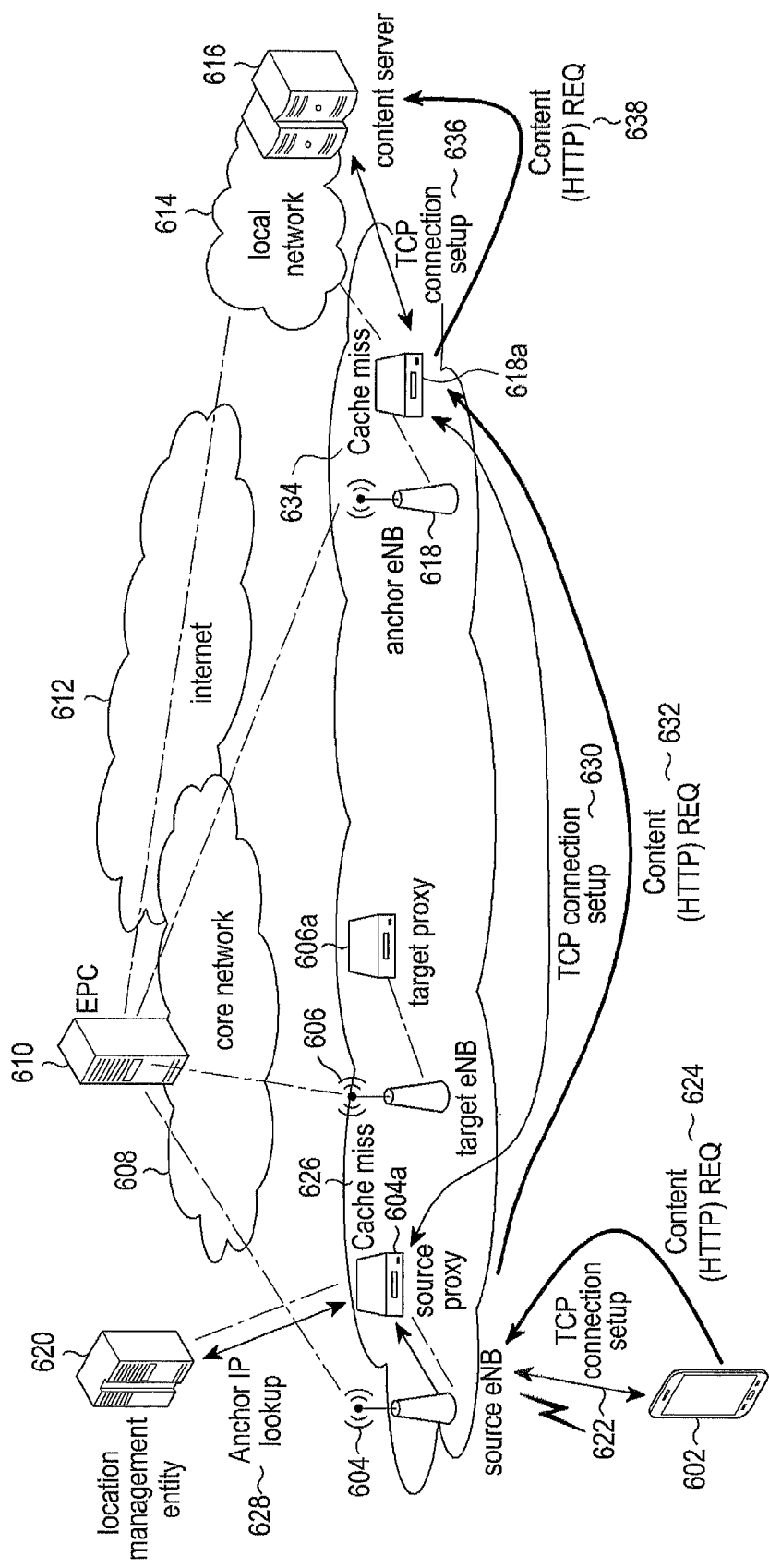
FIG. 6 illustrates a basic connection setup procedure according to an embodiment of the present disclosure.

FIG. 6 illustrates a basic connection setup procedure according to an embodiment of the present disclosure. Here, a procedure in which three TCP connections between a UE 602, a proxy 604*a* or 606*a*, an anchor proxy 618*a*, and a content server 616 has been illustrated. The descriptions will be provided based on a case in which cache miss indicating that a content required by the UE 602 does not exist in a proxy 604*a*, 606*a*, and 618*a* occurs.

Referring to FIG. 6, the UE 602 attempts to establish a TCP session with a content server 616 in step 622. In this example, a source eNB 604 filters traffic from the UE 602 using a filter so as to let only a desired session out to the Internet. In this instance, generally, a 5-tuple filter is used. The 5-tuple filter performs filtering based on five criteria, such as a source IP address, a destination IP address, a source port number, a destination port number, and a protocol. For example, when a session of which a source IP is 10.20.30.*, a destination IP is 10.20.*.*, a source port number is between 100~400, and a destination port number is between 60 and 80, and which uses a TCP protocol, may pass through the filter. As another example, filtering may be performed based on a destination IP. The source proxy 604*a* may sense a UE 602's attempt for a TCP connection transferred from the source eNB 604, and sets up a TCP connection with the UE 602, instead of a destination, that is, the content server 616.

In step 624, a content request, such as a Hyper Text Transfer Protocol (HTTP) request message, or a request message of an application level may be received in the source proxy 604*a* from the UE 602 through the TCP connection. In step 626, the source proxy 604*a* senses that cache miss 626 associated with a content requested by the UE 602 occurs, that is, the content requested by the UE 602 is not stored in the source proxy 604*a*, or senses that the requested content is a service that is not associated with a cache, and determines that connection to the content server 616 is required. In step 628, the source eNB 604 or a source proxy 604*a* may look up an IP address of an eNB 618 which is to be an anchor, in a location management entity 620. As an example, the location management entity 620 is formed by a provider of a wireless communication system, and manages the anchor eNB base station 618 or the anchor proxy 618*a* with respect to at least one of the content servers existing on the Internet.

In step 630, the source proxy 604*a* sets up a TCP connection with the anchor proxy 618*a* of the anchor eNB 618. In step 632, the source proxy 604*a* transfers, to the anchor proxy 618*a* through the TCP connection, a content request from the UE 602 such as an HTTP request message or a request message of an application level. In step 634, the anchor proxy 618a senses cache miss associated with the content requested by the content request or senses that the requested content is a service that is not associated with a cache, and sets up a TCP connection with the content server 616 in step 636. In step 638, the anchor proxy 618a transfers the content request to the content server 616 through the TCP connection. Subsequently, a TCP service from the content server 616 to the UE 602 is provided through proxy caches 604a and 618a.

The anchor proxy 618a may act as an anchor in a layer 4 in the described structure. In the wireless communication system, a source eNB and a target eNB are determined from among advanced eNBs based on a location of the UE 602, and a proxy cache of the advanced eNB 618 that is close to the content server 616 to which the UE 602 is desired to connect is designated as the anchor proxy 618a of the content server 616.

Figure 7:
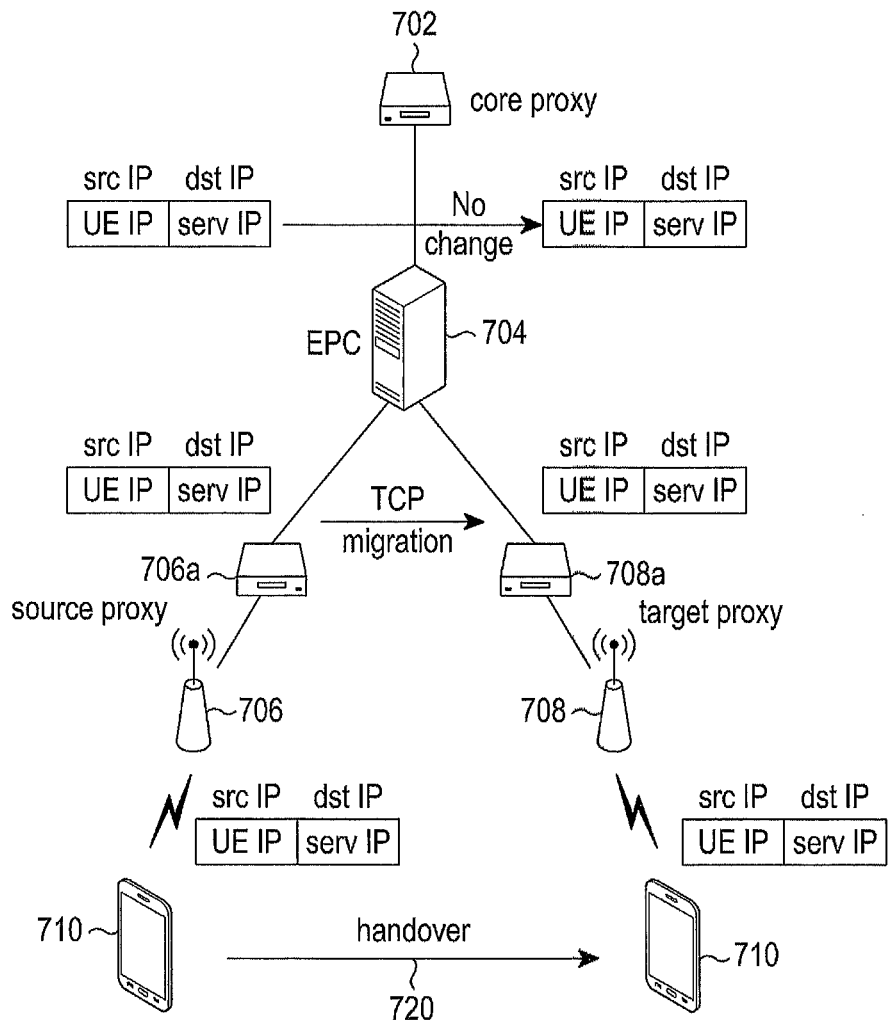
FIG. 7 illustrate a handover procedure among proxy caches in a wireless communication system.

FIG. 7 illustrates a handover procedure among proxy caches in a wireless communication system. Here, an address conversion is illustrated in a case in which a UE 710 connects to the Internet through an EPC 704, and the EPC 704 operates as an anchor node for a handover of the UE 710.

Referring to FIG. 7, the UE 710 connects to the EPC 704 through a source proxy 706a of a source eNB 706, moves through a handover 720, and then, connects to the EPC 704 through a target proxy 708a of a target eNB 708. The EPC 704 provides an Internet service to the UE 710 that is handed over through a core proxy 702 that connects to the Internet at an end of the wireless communication system.

The EPC 704 acts as an anchor and thus, a source IP address and a destination IP address between the core proxy 702 and the EPC 704 may be maintained as a UE IP and a server IP without being changed even after a handover. A packet traffic occurring from the UE 710 may be taken out to the Internet by passing through the EPC 704, and in this instance, a source IP address of the packets is exposed as a UE IP. Proxy caches 706a and 708a located in a back end of the EPC 704 may not need to participate in a handover.

A source IP address of a packet traffic passing though between the EPC 704 and eNBs 706 and 708 is a UE IP. Proxy caches 706a and 708a existing between the EPC 704 and eNBs 706 and 708 may maintain the source IP address of each packet as the UE IP, and performs TCP communication with the UE 710, and simultaneously, performs TCP communication with a content server (not illustrated), so as to separate TCP sessions. A TCP session with the UE 710 and a TCP session with a content server are separated from each other and thus, when a cache hit of a requested content occurs, the proxy cache 706a or 708a may transmit the requested content to the UE 710.

As described above, although a source IP address of each packet is set to a UE IP in an IP level, actually, the EPC 704 and the eNBs 706 and 708, that is, the proxy caches 706a and 708a, may transfer a GPRS (General Packet Radio Service) Tunneling Protocol (GTP) tunneling header to each packet and may manage mobility of the UE 710.

When a handover occurs, a TCP migration from the source proxy 706a to the target proxy 708a may occur. The core proxy 702 may not need to be aware of the TCP migration event. The handover of an IP level may be performed between the eNBs 706 and 708 and the EPC 704 based on a protocol standard of the wireless communication system, and accordingly, a TCP session migration of the source proxy 706a into the target proxy 708a may be performed The TCP session migration indicates that TCP state information (or a TCP context), such as a data sequence number associated with existing TCP sessions maintained in a source proxy, an ACK number, a receive window size, a congestion window size, a sequence number of packets including packet loss, and the like, is transmitted to the target proxy 708a from the source proxy 706a, and overwrites TCP state information of the target proxy 708a.

Figure 8:
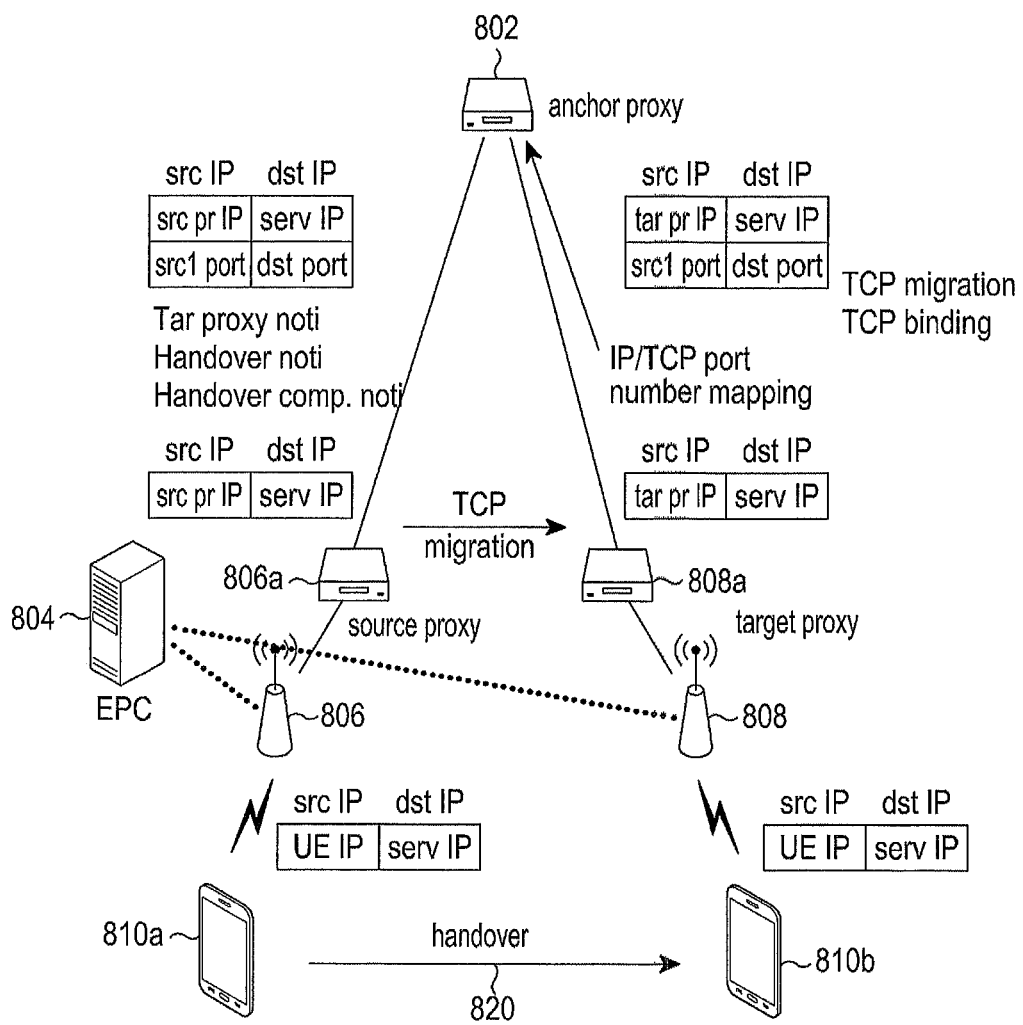
FIG. 8 illustrates a handover procedure using an anchor proxy according to an embodiment of the present disclosure.

FIG. 8 illustrates a handover procedure using an anchor proxy according to an embodiment of the present disclosure. Here, when a UE 810 connects to the Internet through a source proxy 806a of a source eNB 806, and when the UE 810 moves to a target proxy 808a of a target eNB 808 through a handover 820, an anchor proxy 802 that is designated for a content server (not illustrated) operates as an anchor node for a handover 820 of the UE 810.

Referring to FIG. 8, the source proxy 806a may set an IP address of the source proxy 806a as a source IP of a packet when the source proxy 806a transmits a packet generated from the UE 810 to the anchor proxy 802. After the handover, the target proxy 808a may set a source IP address of a packet from the UE 810 to an IP address of the target proxy 808a. For this, when the handover 820 occurs, the anchor proxy 802 may set a new TCP session with the target proxy 808a, and in this instance, may overwrite the new TCP session with state information of a TCP session with the source proxy 806a.

In particular, the UE 810 may transmit, to the source eNB 806, a packet of which a source IP address is set to a UE IP and a destination IP address is set to a server IP address, and the source eNB 806 may transmit the packet to the source proxy 806a. The source proxy 806a may change the source IP address of the packet into an IP address of the source proxy 806a and may transfer the same to the anchor proxy 802.

When the handover 820 occurs, the source proxy 806a may notify the anchor proxy 802 that a handover to the target proxy 808a occurs. The anchor proxy 802 may set a new TCP session with the target proxy 808a. The new TCP session may be established in response to a request from the target proxy 808a or a request from the anchor proxy, and in any instance, a new TCP port number may be designated. A source IP address of a packet traffic associated with the new session may be set to an IP address of the target proxy 808a, and a TCP port number starts with a new value. The anchor proxy 802 may recognize mapping source IP addresses and TCP ports among TCP sessions, and may overwrite the new TCP session with the state information of the existing TCP session, in response to the handover event 820. Accordingly, TCP port number mapping, TCP migration, or TCP binding may be performed in the anchor proxy 802.

After the handover, a packet from the UE 810 may be transferred to the target proxy 808a through the target eNB 808. The target proxy 808a may change a source IP address of the packet into an IP address of the target proxy 808a and may transfer the same to the anchor proxy 802. The anchor proxy 802 may recognize that the TCP session between the UE 810 and the source proxy 806a has migrated into the TCP session between the UE 810 and the target proxy 808a through the handover procedure of a TCP level and thus, may recognize that a packet received from the target proxy 808a is transferred from the UE 810.

Embodiments associated with the handover procedure of a TCP level which enables the anchor proxy 802 to directly involve in the handover 820, will be described below.

Figure 9:
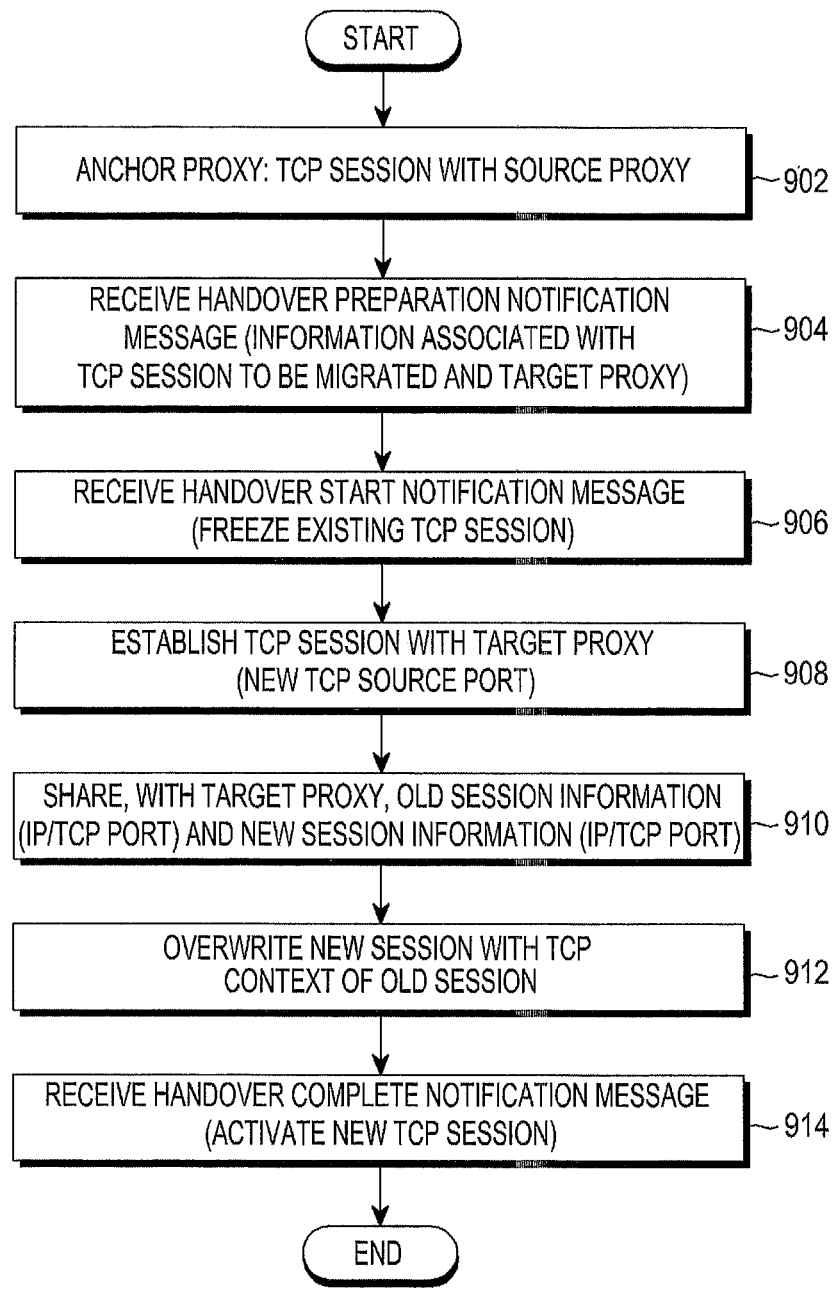
FIG. 9 illustrates a flowchart of a TCP migration procedure in an anchor proxy during a handover according to an embodiment of the present disclosure.

FIG. 9 illustrates a flowchart of a TCP migration procedure in an anchor proxy during a handover according to an embodiment of the present disclosure.

Referring to FIG. 9, an anchor proxy has a TCP session with a source proxy in step 902. In step 904, the anchor proxy receives, from the source proxy, a handover preparation notification message including information associated with a TCP session to be migrated and a target proxy, and stores the same. The handover preparation notification message is embodied as a TCP packet provided in a format predetermined in agreement with the anchor proxy. When a handover start notification message is received from the source proxy in step 906, the anchor proxy may freeze a TCP session with the source proxy that is currently in progress, and establishes a new TCP session with the target proxy in step 908. The new TCP session may be established in response to a request from the target proxy or a request from the anchor proxy. Here, a new TCP port number to be used in the new TCP session may be set. Also, a reason of freezing the TCP session with the source proxy is that there may be a need of resuming the existing TCP session due to a handover ping-pong.

In step 910, the anchor proxy may share, with the target proxy, session information associated with the TCP session with the source proxy, that is, IP addresses and a TCP port number, and session information associated with the new TCP session with the target proxy. The target proxy may recognize an existing TCP session of the anchor proxy corresponding to the TCP port number of the new TCP session. In step 912, the anchor proxy may overwrite state information of the new TCP session with a TCP context (that is, state information) associated with the existing TCP session (that is, the TCP session with the source proxy). In step 914, the anchor proxy may activate the new TCP session so that the new TCP session operates normally when a handover complete notification message is received from the target proxy. As described above, the TCP migration may be performed by overwriting the new TCP session with the state information of the existing TCP session.

The handover start notification message of step 906 for freezing the existing TCP session with the source proxy may be embodied as a zero window message. A TCP flow control mechanism may provide the zero window message indicating that a TCP receive window size is zero, and the anchor proxy may interrupt transmission over the TCP session with the source proxy when the anchor proxy receives the zero window message from the source proxy. The handover complete notification message of step 914 may be embodied as a TCP packet including a TCP receive window size that is set to a value different from zero. The anchor proxy may receive the TCP packet from the target proxy, and may resume the TCP session with the target proxy.

FIG. 9 illustrates an example of a case of overwriting a TCP context through TCP migration. As another embodiment, the anchor proxy may bind an old TCP session with the source proxy and the new TCP session with the target proxy so that the two TCP sessions operate as a single session. In this case, the anchor proxy may bind the TCP sessions, as opposed to overwriting a TCP context.

Figure 10:
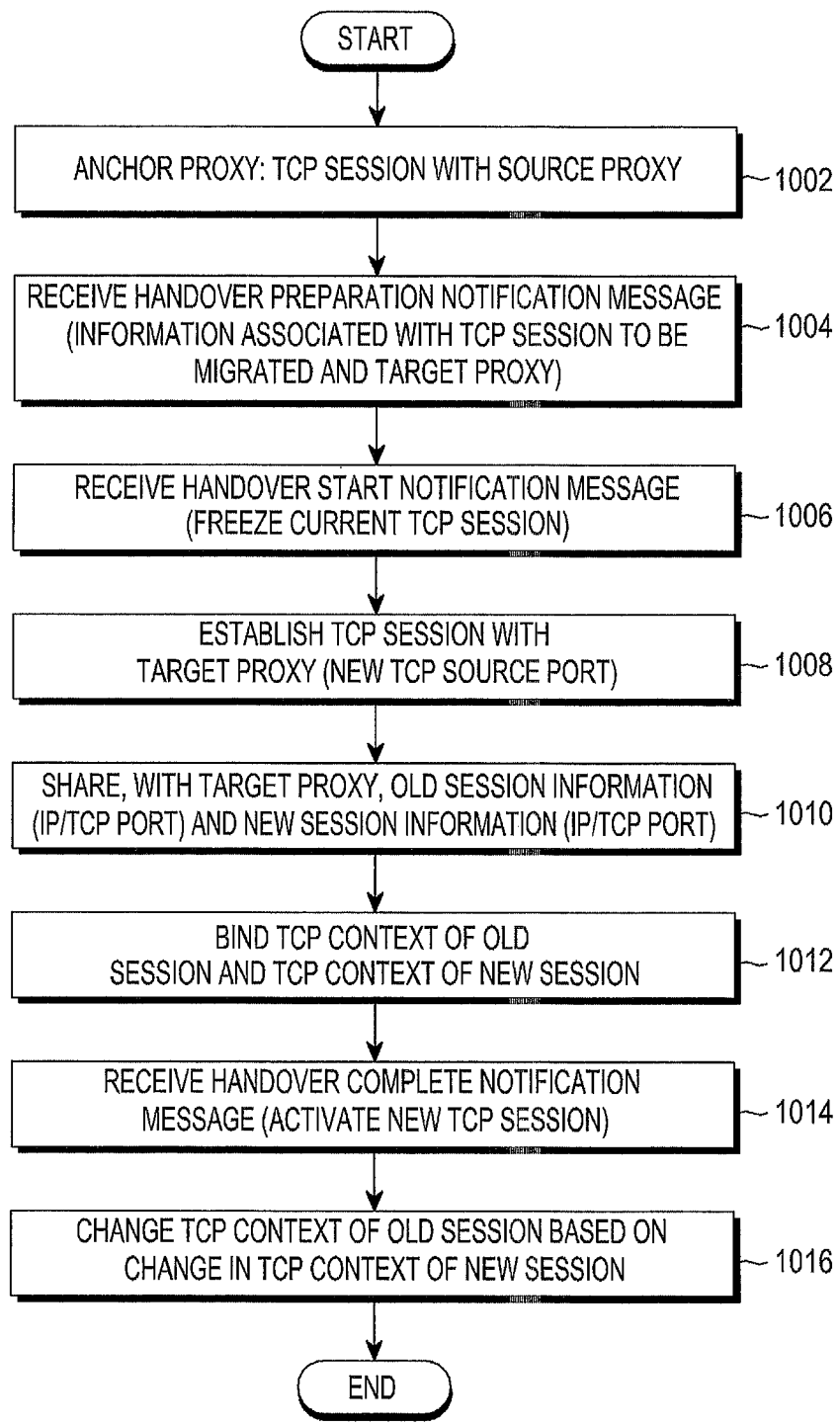
FIG. 10 illustrates a flowchart of a TCP binding procedure in an anchor proxy during a handover according to an embodiment of the present disclosure.

FIG. 10 illustrates a flowchart of a TCP binding procedure in an anchor proxy during a handover according to an embodiment of the present disclosure.

Referring to FIG. 10, in step 1002, an anchor proxy has a TCP session with a source proxy. In step 1004, the anchor proxy receives, from the source proxy, a handover preparation notification message including information associated with a TCP session to be migrated and a target proxy, and stores the same. When a handover start notification message is received from the source proxy, the anchor proxy freezes a TCP session with the source proxy that is currently in progress in step 1006, and establishes a new TCP session with the target proxy in step 1008. Here, a new TCP port number to be used in the new TCP session is set.

In step 1010, the anchor proxy shares, with the target proxy, session information associated with the TCP session with the source proxy and session information associated with the new TCP session with the target proxy. The target proxy may recognize an existing TCP session of the anchor proxy corresponding to the TCP port number of the new TCP session. In step 1012, the anchor proxy may bind the TCP session with the source proxy (that is, the existing TCP session) and the new TCP session with the target proxy. Here, binding indicates storing, in the anchor proxy, mapping information between a context of the existing TCP session and a context of the new TCP session. For example, the anchor proxy may link TCP sequence numbers of the existing TCP session and TCP sequence numbers of the new TCP session. For example, when the TCP sequence numbers of the new TCP session increase by 500 as packets are transmitted over the new TCP session, the anchor proxy may increase the TCP sequence numbers of the existing TCP session by 500. As described above, the anchor proxy may manage state information of the existing TCP session by correspondingly changing the state information of the existing TCP session when a data sequence number of the new TCP session, an ACK number, a receive window size, a congestion window size, and sequence numbers of loss packets are changed. As described above, when a TCP binding is applied, TCP migration may not need to be repeatedly performed although a handover ping-pong occurs.

In step 1014, when a handover complete notification message is received from the target proxy, the anchor proxy may activate the new TCP session so that the new TCP session normally operates. In step 1016, the anchor proxy may update the TCP context of the existing TCP session based on a change in the state of the new TCP session. Particularly, the anchor proxy is aware of information associated with a packet that the source proxy transmits lastly, by obtaining the information from the handover start notification message received in step 1006. For example, a case in which data segments have been received over the existing TCP session up to a data segment #29, and transmission of data segments over the new TCP session starts with a data segment #230, will be described. A sequence number which starts from the new TCP session is randomly determined. Then, the anchor proxy may recognize that the data fragment #230 of the new TCP session corresponds to a data fragment #30 of the existing TCP session. Actually, the target proxy may receive more or fewer data segments than the anchor proxy recognizes due to various reasons. The discordance may be normalized based on a TCP algorithm and thus, the anchor proxy may need to perform a parameter conversion between the existing TCP session and the new TCP session based on the TCP binding.

Figure 11:
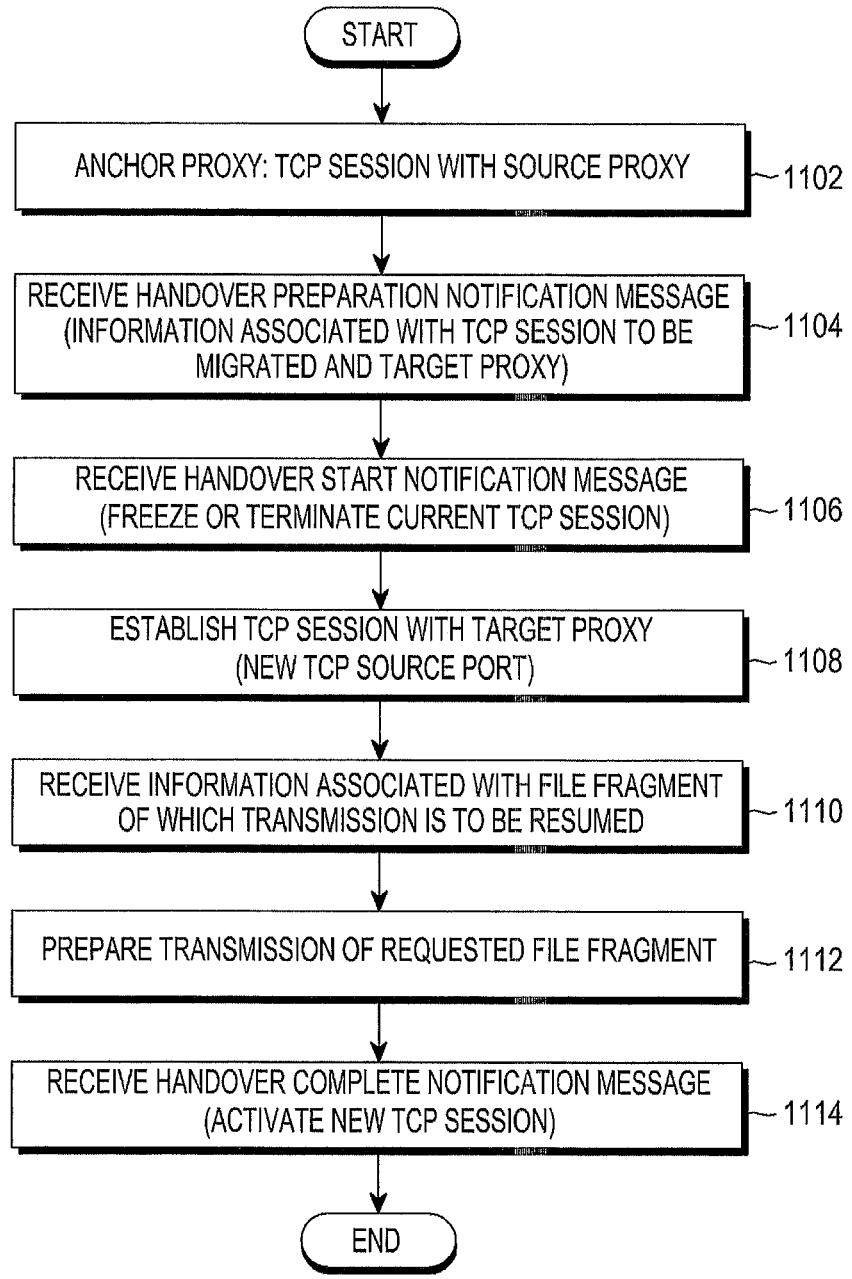
FIG. 11 illustrates a flowchart of a procedure that supports file fragment transmission in an anchor proxy during a handover according to an embodiment of the present disclosure.

FIG. 11 illustrates a flowchart of a procedure in which an anchor proxy supports file fragment transmission during a handover according to an embodiment of the present disclosure. Here, an operation that supports a handover through the file fragment transmission in a state in which the anchor proxy opens a new TCP session, will be described.

Referring to FIG. 11, in step 1102, an anchor proxy has a TCP session with a source proxy. In step 1104, the anchor proxy receives, from the source proxy, a handover preparation notification message including information associated with a TCP session to be migrated and a target proxy, and stores the same. In step 1106, when a handover start message is received from the source proxy, the anchor proxy freezes the TCP session with the source proxy that is currently in progress, and establishes a new TCP session with the target proxy in step 1108. Here, a new TCP port number to be used in the new TCP session is set.

In step 1110, the anchor proxy receives, from the source proxy, information associated with a file fragment of which transmission is to be resumed, for example, a sequence number or location information of a file fragment. In step 1112, the anchor proxy prepares transmission of a requested file fragment based on the received information. In step 1114, when a handover complete notification message is received from the target proxy, the anchor proxy may activate the new TCP session so that the new TCP session normally operates and may resume transmission of the requested file fragment.

For example, when a handover occurs in a state in which only data of 3 MB positioned in a front side of a file of 5 MB is downloaded, the anchor proxy may download data of 4 MB through 5 MB from a back side of the file to the target proxy. For this, the anchor proxy obtains, from the source proxy, information indicating a file fragment to be transmitted to the target proxy, for example, information associated with a location of the file fragment of which transmission is to be resumed.

Figure 12:
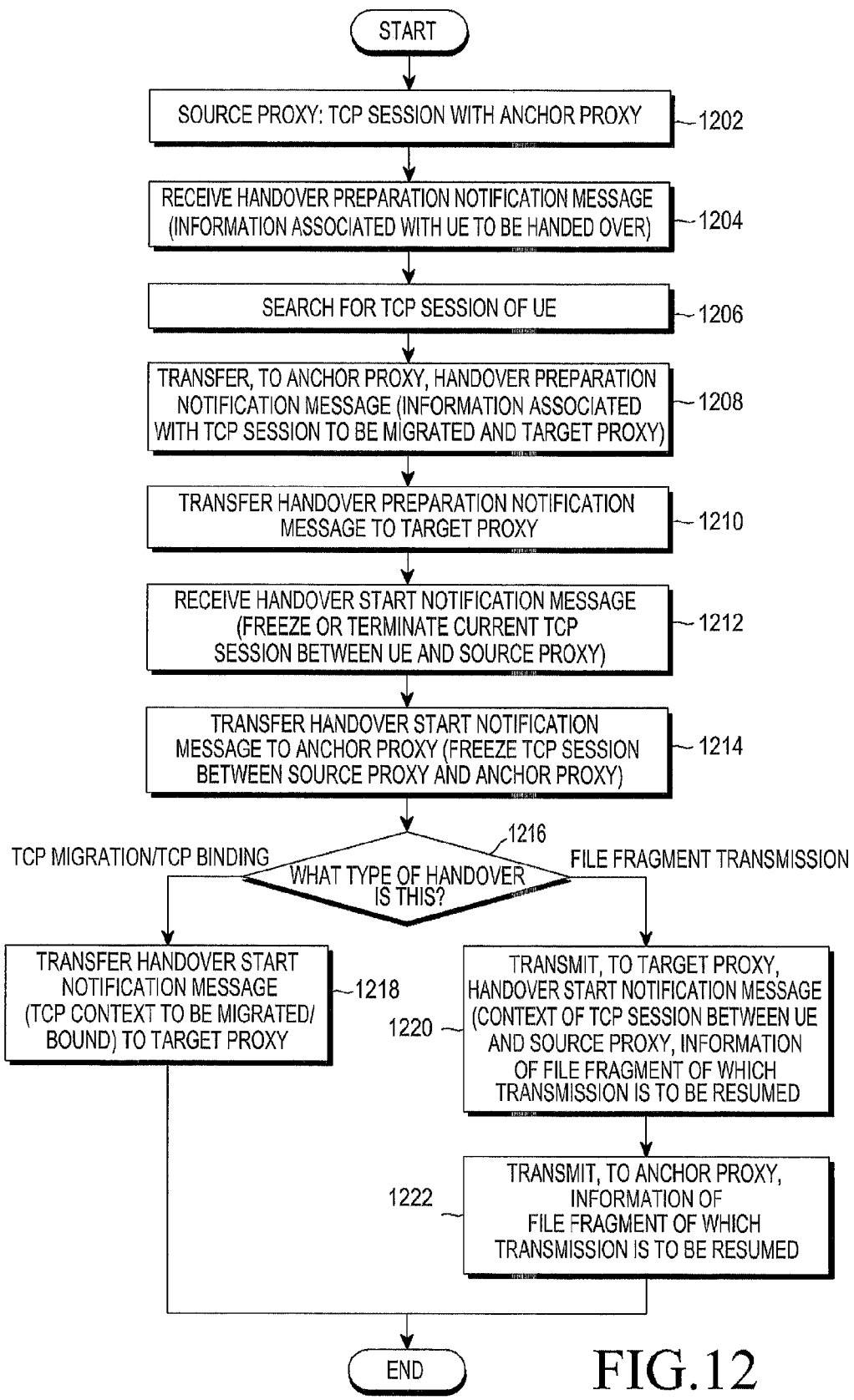
FIG. 12 illustrates a flowchart of a handover procedure by a source proxy according to an embodiment of the present disclosure.

FIG. 12 illustrates a flowchart of a handover procedure by a source proxy according to an embodiment of the present disclosure.

Referring to FIG. 12, a source proxy has a TCP session with an anchor proxy in step 1202. In step 1204, the source proxy receives, from a source eNB, a handover preparation notification message including information associated with a UE that is to be handed over, for example, an IP address of a UE. In step 1206, the source proxy performs a search for whether a TCP session that is maintained for the UE exists using the IP address of the UE, and transfers the handover preparation notification message to an anchor proxy in step 1208. The handover preparation notification message may include session information associated with the TCP session to be migrated, and information associated with a target proxy which is detected by the UE, and may be embodied as, for example, a TCP packet provided in a format predetermined in agreement with the anchor proxy. The information associated with the target proxy may be obtained from, for example, information associated with a target eNB included in the handover preparation notification message received from the source eNB. Also, in step 1210, the source proxy transfers the handover preparation notification message to the target proxy. The handover preparation notification message transferred to the target proxy may include session information associated with the TCP session to be changed (an IP address, a TCP port number, and the like) and information associated with the UE to be handed over.

In step 1212, the source proxy may receive a handover start notification message from the source eNB, and may freeze or terminate a currently ongoing TCP session with the UE. Here, freezing the TCP session is for coping with a handover ping-pong in the future. In step 1214, the source proxy transmits, to the anchor proxy, the handover start notification message for requesting freezing the TCP session between the source proxy and the anchor proxy. The handover start notification message may be embodied as a TCP packet including a TCP receive window size that is set to zero, that is, a zero window message.

In step 1216, the source proxy proceeds with step 1218 or step 1220, based on a type of handover. Here, the type of handover may be determined based on various criteria such as a type of TCP session that is currently in progress, determination by the source proxy, a request by a UE or a system, and the like. As an example, when a handover occurs while a large sized file is transmitted through a current TCP session, the source proxy may proceed with step 1220 for file fragment transmission, and otherwise, may proceed with step 1218.

In step 1218, the source proxy may transmit the handover start notification message to the target proxy, to perform TCP migration or TCP binding. The handover start notification message includes a context (that is, state information) associated with a TCP session to be migrated or to be bound. Particularly, a context of the TCP session between the UE and the source proxy and a context of the TCP session between the source proxy and the anchor proxy are included. The context includes at least a data sequence number and an ACK number.

In step 1220, the source proxy transmits, to the target proxy, the handover start notification message including the context associated with the TCP session between the UE and the source proxy and information associated with a file fragment that is to be taken over when a handover occurs. The target proxy may change the TCP session between the UE and the source proxy using the context associated with the TCP session. In step 1222, the source proxy may transmit, to the anchor proxy, information associated with the file fragment to be taken over when a handover occurs, so that the anchor proxy transmits, to the target proxy, file fragments after the file fragment.

Figure 13A:
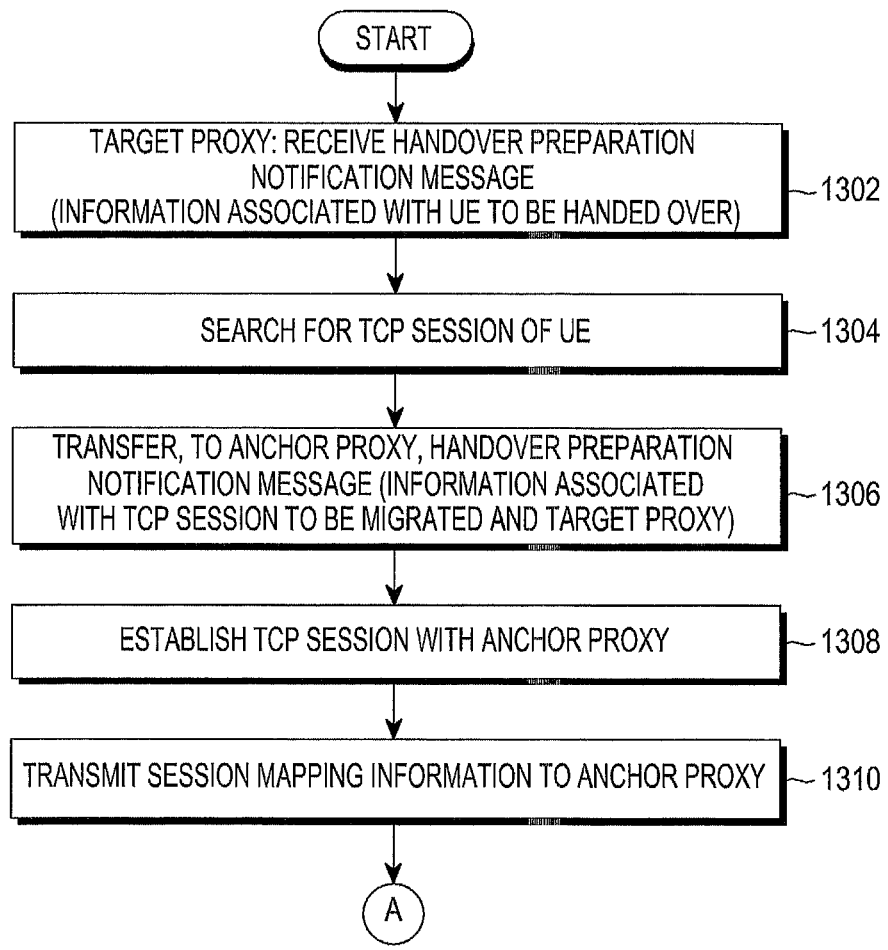
FIGS. 13A and 13B illustrate a flowchart of a handover procedure by a target proxy according to an embodiment of the present disclosure.
Figure 13B:
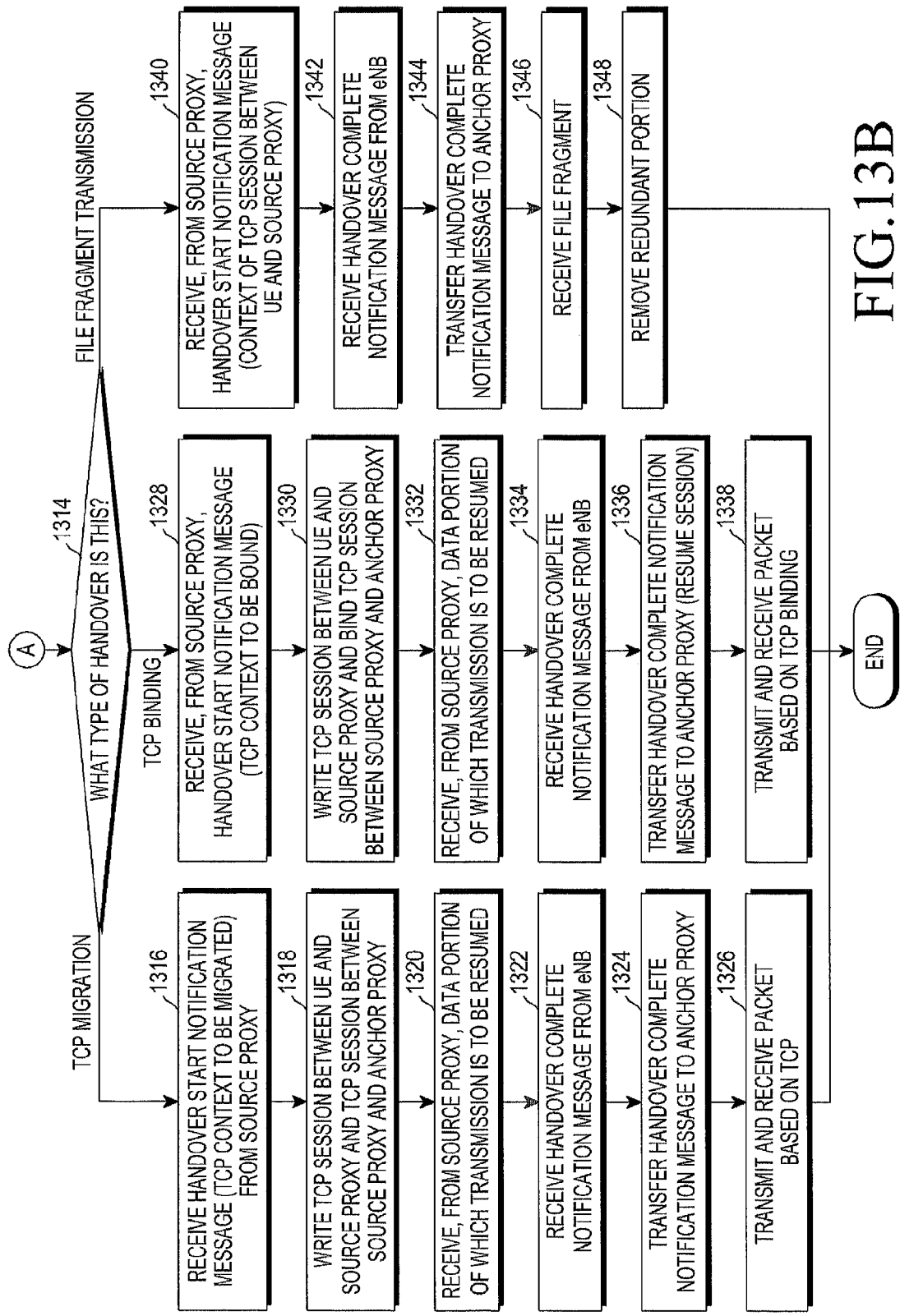

FIGS. 13A and 13B illustrate a flowchart of a handover procedure by a target proxy according to an embodiment of the present disclosure.

Referring to FIGS. 13A and 13B, in step 1302, a target proxy receives, from a source proxy, a handover preparation notification message including session information associated with a TCP session to be changed, information associated with a UE to be handed over (that is, an IP address), and information associated with an anchor proxy. In step 1304, the target proxy performs a search for whether a TCP session that is maintained for the UE exists based on the information associated with the UE. This is to determine whether an existing TCP session that is maintained for the UE exists for a case in which a handover ping-pong occurs. When the existing TCP session does not exist, a new TCP session is established. In step 1306, the target proxy transfers, to the anchor proxy, the handover preparation notification message including the session information associated with the TCP session to be migrated and information associated with the target proxy. When the anchor proxy already has the session information associated with the TCP session to be changed and the information associated with the target proxy, transmission of the handover preparation notification message in step 1306 may be omitted, or the handover preparation notification message may be transmitted to report only that the target proxy is ready for a handover.

In step 1308, the target proxy establishes a TCP session with the anchor proxy to be used for the UE. The TCP session may be established in response to a request from the target proxy (that is, transmission of a TCP synchronization packet) or a request from the anchor proxy. When establishing the TCP session is initiated in response to the request from the anchor proxy, the target proxy may transfer, to the anchor proxy, an IP address and a port number of the target proxy through the handover preparation notification message in step 1306. In step 1310, mapping information between the existing TCP session with the source proxy and the new TCP session with the target proxy may be transmitted to the anchor proxy. The mapping information may instruct mapping of IP addresses and TCP port numbers so that the anchor proxy maps the existing TCP session and the new TCP session. In step 1314, the target proxy proceeds with one of steps 1316, 1328, and 1340, based on a type of handover. Here, the type of handover may be determined based on various criteria, such as a type of TCP session that is currently in progress, determination by the source proxy, a request by a UE or a system, and the like. As an example, when a handover occurs while a large sized file is transmitted through a current TCP session, the source proxy may proceed with step 1340 for file fragment transmission, and otherwise, may proceed with step 1316 or 1328.

In step 1316, the target proxy may receive a handover start notification message including contexts associated with the TCP session to be migrated, from the source proxy. The handover start notification message includes a context associated with a TCP session between the UE and the source proxy, a context associated with the TCP session between the source proxy and the anchor proxy, and session information associated with the two sessions. In step 1318, the target proxy overwrites a TCP session between the UE and the target proxy and the TCP session between the target proxy and the anchor proxy, with the contexts associated with the TCP session between the UE and the source proxy and the contexts associated with the TCP session between the source proxy and the anchor proxy. In step 1320, the target proxy receives, from the source proxy, information associated with data fragments of which transmission is to be started. That is, the source proxy may transfer, to the target proxy, data fragments (that is, packets) that the source proxy receives from the anchor proxy but is yet to transfer to the UE. For this, the source proxy may maintain a TCP session with the target proxy to exchange data and state information.

In step 1322, the target proxy receives, from a target eNB, a handover complete notification message indicating that a handover of a wireless protocol layer is completed. In step 1324, the target proxy transfers, to the anchor proxy, the handover complete notification message, so as to instruct the anchor proxy to activate the new TCP session. In step 1326, the target proxy receives packets from the anchor proxy through the new TCP session, and removes a redundant packet and requests retransmission of an omitted packet from the anchor proxy through an ACK, based on a TCP protocol.

In step 1328, the target proxy receives, from the source proxy, a handover start notification message including contexts associated with a TCP session to be bound. The handover start notification message includes the context associated with the TCP session between the UE and the source proxy, the context associated with the TCP session between the source proxy and the anchor proxy, and session information associated with the two sessions. In step 1330, the target proxy may overwrite the TCP session between the UE and the target proxy with the TCP session between the UE and the source proxy, and may bind the TCP session between the source proxy and the anchor proxy and the TCP session between the target proxy and the anchor proxy. In step 1332, the target proxy receives, from the source proxy, data fragments of which transmission is to be started. That is, the source proxy may transfer, to the target proxy, data fragments that the source proxy receives from the anchor proxy but is yet to transfer to the UE. In step 1334, the target proxy receives, from the target eNB, a handover complete notification message indicating that a handover of a wireless protocol layer is completed. In step 1336, the target proxy transfers the handover complete notification message to the anchor proxy so as to instruct the anchor proxy to activate the new TCP session. In step 1338, the target proxy receives packets from the anchor proxy through the new TCP session, and removes a redundant packet and requests retransmission of an omitted packet through an ACK based on a TCP protocol. TCP contexts varying as the packets are transmitted may be continuously updated based on a TCP binding relationship.

As an example, first, second, fourth, fifth, and sixth data fragments are transmitted over the TCP session between the source proxy and the anchor proxy, data transmission over the TCP session newly established between the target proxy and the anchor proxy starts from a data sequence number 104, and the sequence number 104 of the new TCP session corresponds to a sequence number 4 of the existing TCP session based on the TCP binding. Based on various reasons, transmission of data fragments over the new TCP session may start from a sequence number 101 or from a sequence number 107. When the target proxy receives a $101^{st}$ data fragment, first, the target proxy may recognize that a $103^{rd}$ data fragment, that is, the third data fragment in the existing TCP session, is missing by checking mapping with the existing TCP session based on the TCP mapping information, and the target proxy requests retransmission of the $103^{rd}$ data fragment from the anchor proxy through an ACK. As another example, when the target proxy receives a $107^{th}$ data fragment, first, the target proxy transmits an ACK to the anchor proxy so as to receive the $103^{rd}$ data fragment based on the TCP mapping information, and subsequently, receives data fragments starting with a $108^{th}$ data fragment.

In step 1340, the target proxy receives, from the source proxy, a handover start notification message including a context associated with the existing TCP session. The handover start notification message may include a context associated with a TCP session between the UE and the source proxy. In step 1342, the target proxy receives, from the target eNB, a handover complete notification message indicating that a handover of a wireless protocol layer is completed. In step 1344, the target proxy transfers, to the anchor proxy, the handover complete notification message, so as to instruct the anchor proxy to activate the new TCP session. In step 1346, the target proxy starts receiving, from the anchor proxy, file fragments of which transmission is to be resumed based on a packet unit. In step 1348, the target proxy removes redundant packets from the packets received from the anchor proxy and requests retransmission of an omitted packet based on a TCP protocol, and transfers, to the UE through the target eNB, packets that are not transferred to the UE. In this case, the target proxy may use the packets received from the source proxy in step 1320 for packet alignment.

Hereinafter, embodiments for selecting an anchor proxy (that is, an upper layer proxy or an upper proxy) for an IP layer handover of a UE will be described. In a case in which a cache miss occurs or in a case in which it is regarded that the cache miss occurs, an upper layer proxy loaded for loading a desired content (that is, a content requested by a UE) is defined to be the anchor proxy. The anchor proxy has connections (that is, a network) with lower proxies that are connected through a UE and an eNB, and may act as an upper layer network node that participates in a handover among lower proxies. An anchor node may be designated by a provider of a wireless communication system for each important content server, or may be selected through a predetermined selection procedure.

The anchor proxy is limited to one of proxies close to a desired server, and it is preferable that one that is close to a source proxy from among the proxies is determined to be the anchor proxy. When a cache miss occurs, the source proxy queries whether neighboring proxy caches have a corresponding content, and may directly connect to the server to bring the corresponding content when a proxy cache that has the corresponding content does not exist. However, the anchor proxy is used for supporting a handover and thus, it is preferable that the anchor proxy is located close to the server. For example, an anchor proxy for a YouTube server is required to have a higher cache hit rate when compared to a proxy cache close to a UE. To raise the cache hit rate, all of the traffic for the YouTube server is required to pass through a predetermined number (for example, two or three) of proxy caches. Therefore, it is stable that a few anchor proxy candidates are designated to be located close to the server. An anchor proxy candidate that has the shortest communication distance with the source proxy, that is, the shortest communication delay, may be selected from among the anchor proxy candidate, as the anchor proxy.

Figure 14:
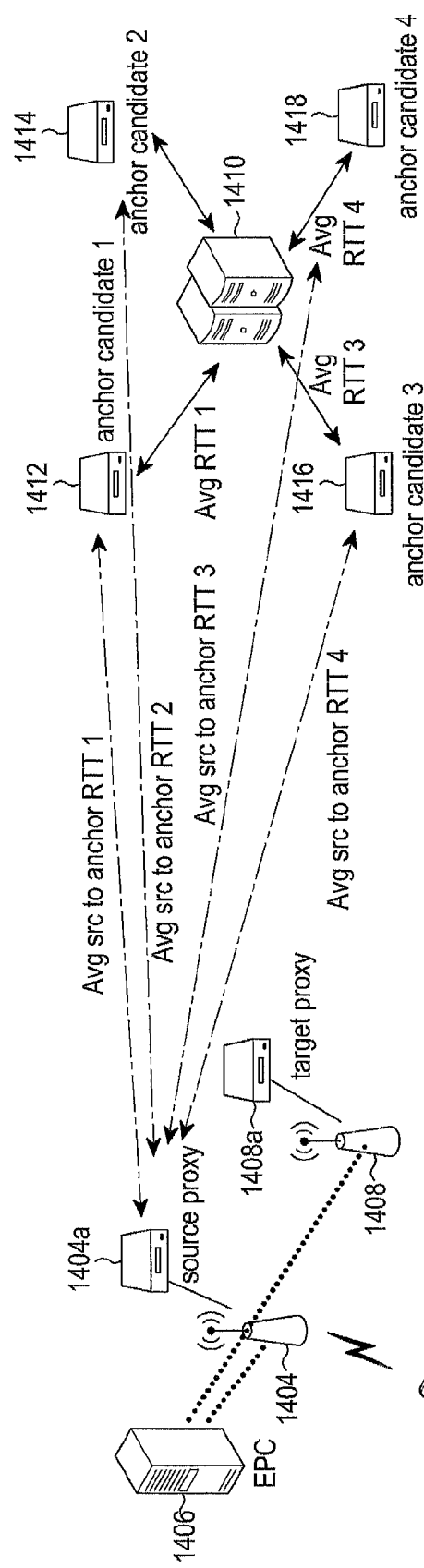
FIG. 14 illustrates selection of an anchor node according to an embodiment of the present disclosure.

FIG. 14 illustrates selection of an anchor node according to an embodiment of the present disclosure. Here, an example of selecting one of the neighboring proxy caches that have communication distances close to a desired content server, as an anchor proxy, has been illustrated.

Referring to FIG. 14, a UE 1402 is handed over from a source proxy 1404a connected to a source eNB 1404 to a target proxy 1408a connected to a target eNB 1408, and an EPC 1406 manages the handover. During the handover, the source proxy 1404a sets proxy caches 1412, 1414, 1416, and 1418 located close to a desired content server 1410, as anchor candidates, and selects, as an anchor proxy, an anchor proxy candidate that has the smallest Round Trip Time (RTT) average value from among RTT average values associated with the anchor candidates 1412, 1414, 1416, and 1418. Here, although an RTT average value is provided as an example, a connection cost calculated through various parameters may be used as an anchor proxy selection criterion as another example. As an example, the connection cost may be calculated based on at least one of a minimum RTT, an average RTT, a maximum RTT, a jitter, a traffic load, and an available bandwidth.

As an example, the source proxy 1404a may select an anchor candidate as the anchor proxy when an average RTT X of the anchor candidate with the content server 1410 is less than a first threshold value, and a sum (X+Y) of the average RTT X with the content server 1410 and an average RTT Y between the source proxy 10404a and the anchor candidate (one of the anchor candidates 1412, 1414, 1416, and 1418) is less than a second threshold value. As another example, the source proxy 1404a may select an anchor candidate as the anchor proxy when a cost of a connection between the anchor candidate (one of the anchor candidates 1412, 1414, 1416, and 1418) and the content server 1410 is less than a first threshold value and a cost of a connection between the source proxy 1404a and the anchor candidate (one of the candidates 1412, 1414, 1416, and 1418) is less than a second threshold value.

Figure 15:
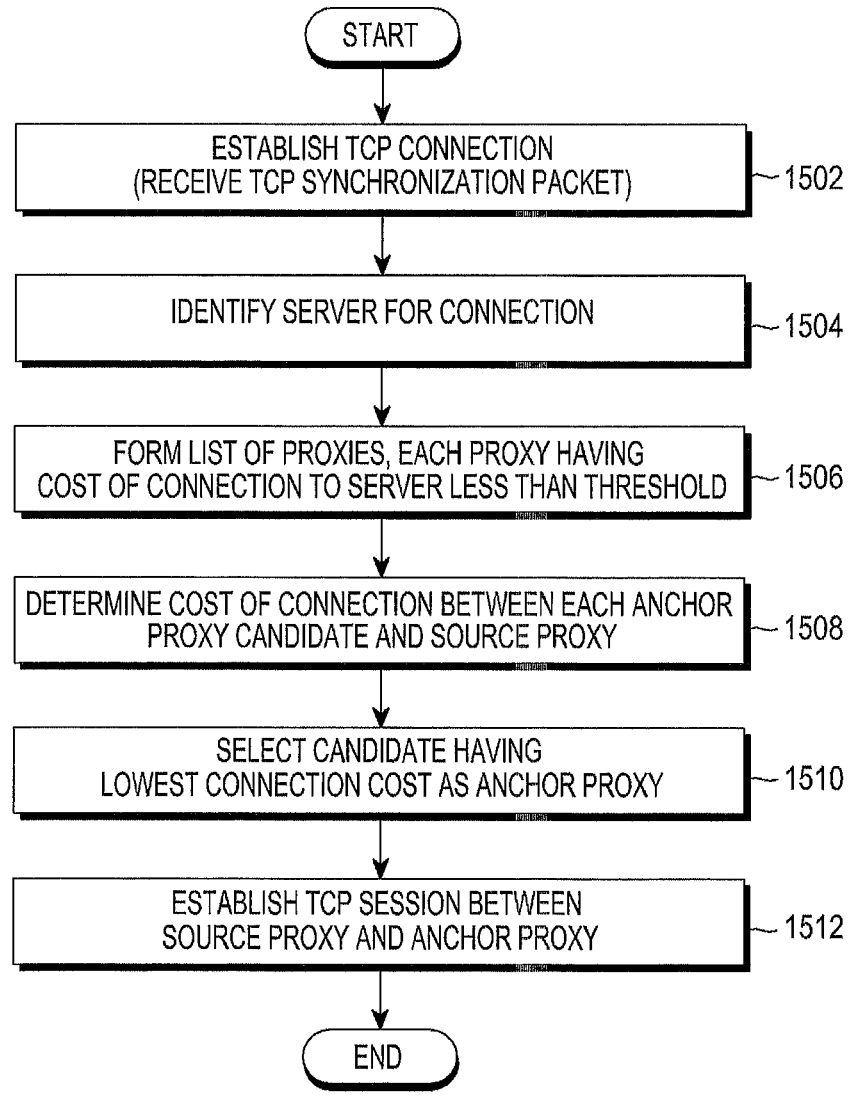
FIG. 15 illustrates a flowchart of a procedure of selecting an anchor proxy according to an embodiment of the present disclosure.

FIG. 15 illustrates a flowchart of a procedure of selecting an anchor proxy according to an embodiment of the present disclosure. Here, although the procedure performed by a source proxy has been described, the procedure of selecting an anchor proxy may be actually performed by a proxy cache to which a UE initially connects for requesting a content before a handover occurs.

Referring to FIG. 15, in step 1502, a source proxy attempts to establish a TCP connection with a server from which a desired content is to be obtained. In this process, a TCP synchronization packet may arrive at the source proxy. In step 1504, the source proxy identifies the desired server based on a destination IP address of the TCP synchronization packet. In step 1506, the source proxy forms a list of proxies, each proxy having a cost of a connection with the server less than a predetermined threshold value. The proxies included in the list may be anchor proxy candidates. The connection cost may be calculated based on at least one of a minimum RTT, an average RTT, a maximum RTT, a jitter, a traffic load, and an available bandwidth.

In step 1508, the source proxy determines the connection cost between each anchor proxy candidate and the source proxy. In step 1510, the source proxy selects an anchor proxy candidate having the lowest connection cost, as an anchor proxy for the server. The cost of the connection with the source proxy may be calculated based on at least one of a minimum RTT, a average RTT, a maximum RTT, a jitter, a traffic load, and an available bandwidth, and the cost of the connection with the source proxy may be calculated based on a scheme independent from calculation of the cost of the connection with the server. In step 1512, the source proxy sets up a TCP session between the source proxy and the anchor proxy.

As an embodiment that may be optionally performed, when the anchor proxy is selected for a content server, the source proxy may provide neighboring caches or other caches included in the same wireless communication system, with information associated with the anchor proxy for the content server.

Figure 16:
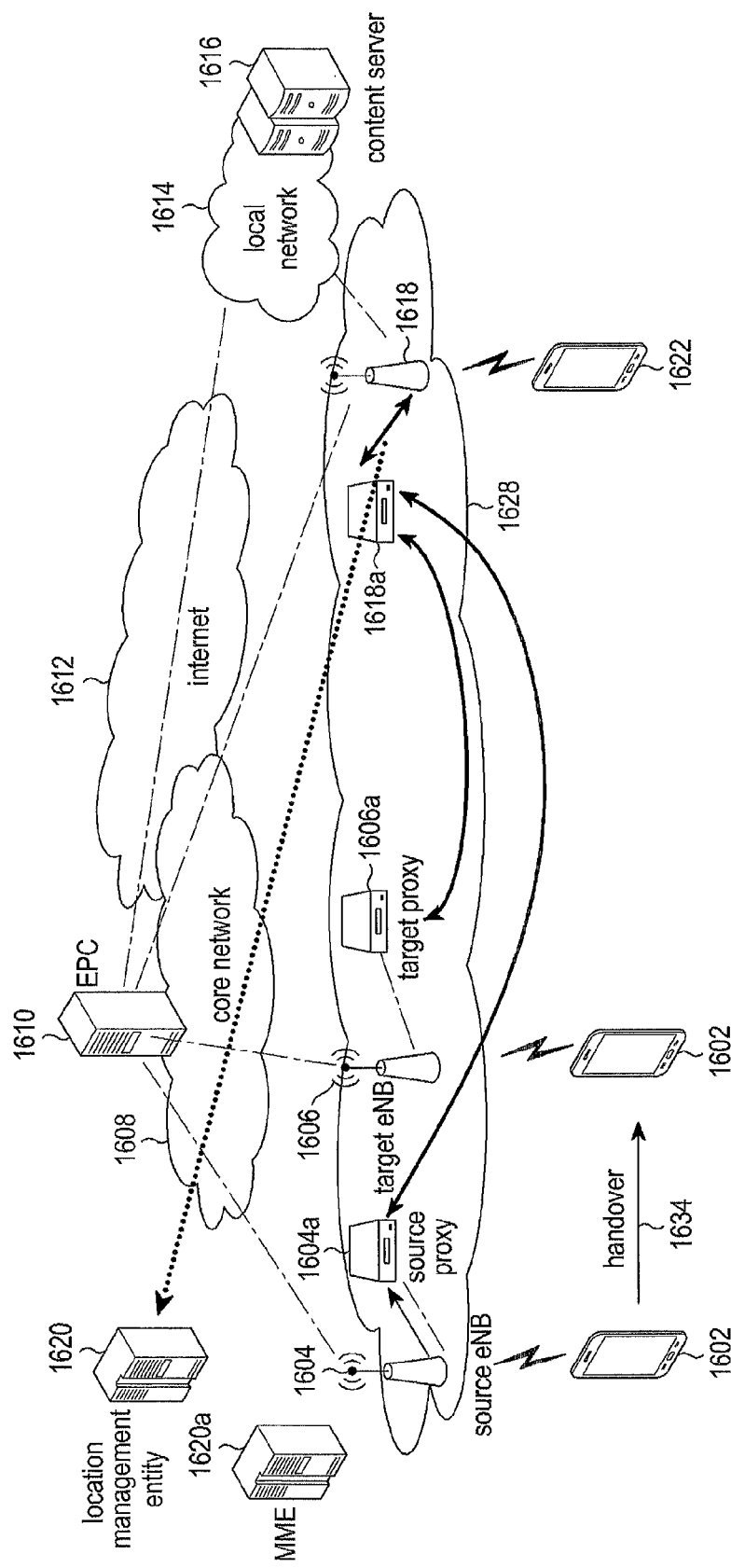
FIG. 16 illustrates selection of an anchor proxy in a case of a connection between User Equipments (UEs) according to an embodiment of the present disclosure.

FIG. 16 illustrates selection of an anchor proxy in a case of a connection between UEs according to an embodiment of the present disclosure.

Referring to FIG. 16, an upper layer proxy may be selected through a similar procedure even in a case in which a UE 1602 connects to another UE 1622, as opposed to a content server 1616 of a local network 1614, through a proxy network 1628. The UE 1622 is configured to operate as a content server. When the UE 1602 connects to a source proxy 1604a through a source eNB 1604 and requests content stored in the UE 1622, the source proxy 1604a inquires of a location management entity 1620 or a mobility management entity (MME) 1620a of a wireless communication system about an eNB to which the UE 1622 is connected. Subsequently, the source proxy 1604a selects a proxy cache having the smallest connection cost in an eNB 1618 to which the UE 1622 is connected, as an anchor proxy for the UE 1622.

When the UE 1602 moves from the source eNB 1604 to which the source proxy 1604a is connected to a target eNB 1606, the anchor proxy 1604a may change a TCP session with the source proxy 1604a to a TCP session with the target proxy 1606a connected to the target eNB 1606, or may bind the TCP session with the source proxy 1604a and the TCP session with the target proxy 1606a, so as to support a handover 1634 of the UE 1602.

Figure 17:
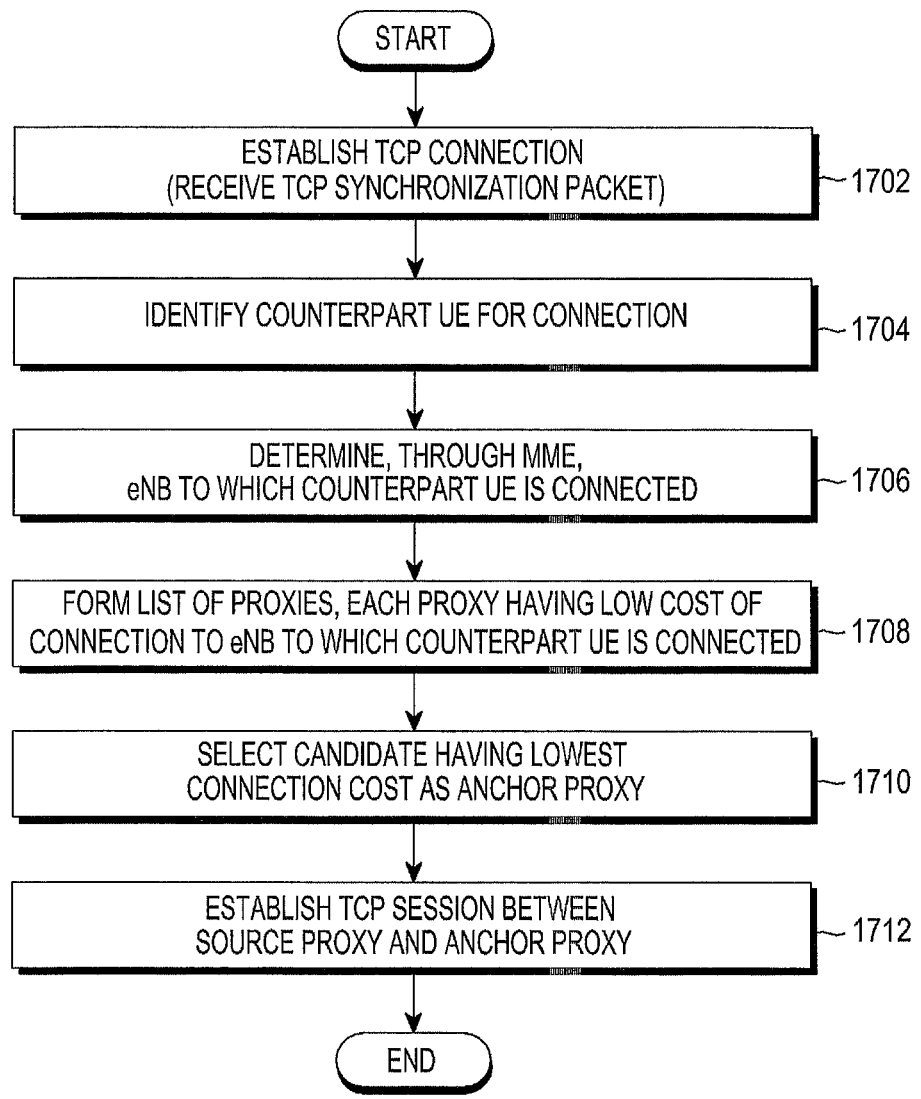
FIG. 17 illustrates a flowchart of a procedure of selecting an anchor proxy that is connected to a UE server according to an embodiment of the present disclosure.

FIG. 17 illustrates a flowchart of a procedure of selecting an anchor proxy that connects to a UE server according to an embodiment of the present disclosure. Here, selection of an anchor proxy for a UE that operates as a server will be described.

Referring to FIG. 17, in step 1702, a source proxy attempts to establish a TCP connection with a counterpart UE from which a desired content is to be obtained, and receives a TCP synchronization packet. In step 1704, the source proxy identifies the counterpart UE to which the source proxy desires to connect based on a destination IP address of the TCP synchronization packet. In step 1706, the source proxy may determine an eNB that connects to the counterpart UE, from the MME. In step 1708, the source proxy forms a list of proxies, each proxy having a low cost of a connection with the eNB to which the counterpart UE is connected, that is, each proxy having a connection cost less than a predetermined value. The proxies included in the list are anchor proxy candidates for the counterpart UE.

In step 1710, the source proxy determines a cost of a connection between each anchor proxy candidate and the source proxy, and selects an anchor proxy candidate having the lowest connection cost as an anchor proxy for the counterpart UE. In step 1712, the source proxy sets up a TCP session between the source proxy and the anchor proxy.

A technology in which a UE connects to the Internet and supports a handover in an Internet level has been described. Therefore, for traffic of which throughput is important, a conventional expensive backhaul network may not be used and the Internet which is relatively inexpensive may be utilized. The source proxy searches for an anchor proxy of an anchor eNB that is closest to the server and sets up a TCP connection and thus, the TCP connection may be maintained when a handover of a UE occurs in a state in which traffic is transferred through the Internet. Also, TCP throughput is increased through a proxy service, and a cache service may be provided in each proxy.

Figure 18:
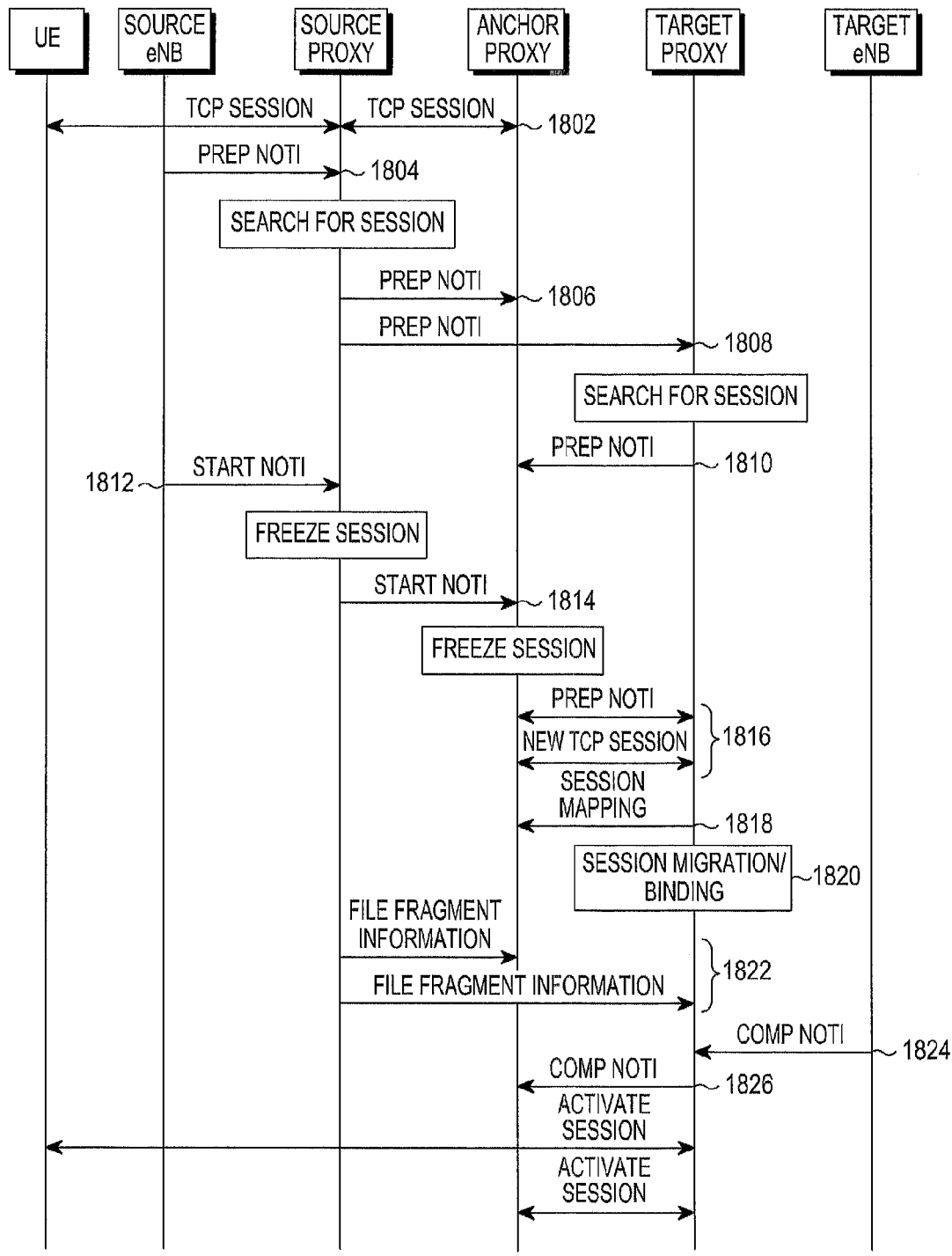
FIG. 18 illustrates a message flowchart of an overall handover procedure according to an embodiment of the present disclosure.

FIG. 18 illustrates a message flowchart of an overall handover procedure according to an embodiment of the present disclosure.

Referring to FIG. 18, in step 1802, a UE connects a TCP session with a source proxy, and the source proxy connects a TCP session for the UE with an anchor proxy. In step 1804, a source eNB senses a handover of the UE, and instructs the source proxy to transmit a handover preparation notification. In response to the instruction, the source proxy searches for a TCP session existing for the UE that is handed over, and transmits the handover preparation notification to the anchor proxy and a target proxy in step 1806 and in step 1808. Through the handover preparation notification, session information associated with a TCP session to be changed may be transferred to each proxy. In step 1810, in response to the handover preparation notification, the target proxy performs a search for whether a TCP session existing for the UE exists, and may transmit, to the anchor proxy, the handover preparation notification including session information of the TCP session to be changed and information associated with the target proxy, when the handover preparation notification is required.

In step 1812, the source eNB transmits a handover start notification to the source proxy, and the source proxy freezes or terminates the TCP session between the UE and the source proxy in response to the handover start notification. In step 1814, the source proxy transmits the handover start notification to the anchor proxy so that the anchor proxy freezes or terminate the TCP session with the source proxy. In step 1816, the anchor proxy freezes or terminates the TCP session with the source proxy, and subsequently, may establish a new TCP session with the target proxy. The target proxy may establish the new TCP session with the anchor proxy. In step 1818, the target proxy transmits, to the anchor proxy, mapping information associated with the new TCP session and a TCP session with the source proxy, when the mapping information is required.

In step 1820, the target proxy performs migration/binding associated with the TCP session with the UE and the TCP session with the anchor proxy. For example, the target proxy performs migration of the TCP session between the UE and the source proxy into the TCP session between the UE and the target proxy, and performs migration of the TCP session between the anchor proxy and the source proxy to the TCP session between the target proxy and the anchor proxy, or performs binding between the TCP session between the anchor proxy and the source proxy and the TCP session between the target proxy and the anchor proxy. In step 1822, the source proxy transfers, to the anchor proxy, information associated with file fragments (that is, packets) to be taken over after a handover, and transfers the file fragments (that is, the packets) to the target proxy. The target proxy receives a handover complete notification from a target eNB in step 1824, and transfers the same to the anchor proxy in step 1826. The anchor proxy normally operates (activates) the TCP session with the target proxy and the TCP session with the UE in response to the handover complete notification, and resumes data transmission for the UE. The target proxy appropriately processes the data transferred from the anchor proxy based on a TCP protocol and transmits the same to the UE.

Figure 19:
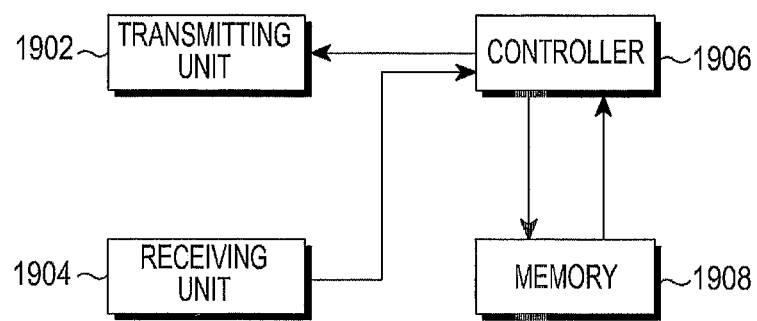
FIG. 19 illustrates a block diagram of a proxy apparatus according to an embodiment of the present disclosure.

FIG. 19 is a block diagram illustrating a proxy apparatus according to an embodiment of the present disclosure. The proxy apparatus is a proxy cache that may operate as at least one of a source proxy, a target proxy, and an anchor proxy.

When the illustrated block composition operates as a source proxy, a receiving unit 1904 receives data or a message from a source eNB, a UE, or an anchor proxy, and transmits the data or the message to a controller 1906. The controller 1906 appropriately processes the data or the message transferred from the receiving unit 1904, and controls a transmitting unit 1902 to transfer the data or the message to the UE, the anchor proxy, or a target proxy. A memory 1908 may store parameters, a program code, and the like required for operations of the controller 1906.

When the illustrated block composition operates as an anchor proxy, the receiving unit 1904 receives data or a message from a source proxy, a target proxy, or a server (a counterpart UE), and transfers the data or the message to the controller 1906. The controller 1906 appropriately processes the data or the message transferred through the receiving unit 1904, and controls the transmitting unit 1902 to transfer the data or the message to the source proxy, the target proxy, or the server (a counterpart UE). The memory 1908 may store parameters, a program code, and the like required for operations of the controller 1906.

When the illustrated block composition operates as a target proxy, the receiving unit 1904 receives data or a message from a source proxy, an anchor proxy, or a target eNB, and transfers the data or the message to the controller 1906. The controller 1906 appropriately processes the data or the message transferred through the receiving unit 1904, and controls the transmitting unit 1902 to transfer the data or the message to the source proxy, the anchor proxy, or a UE. The memory 1908 may store parameters, a program code, and the like required for operations of the controller 1906.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of supporting a handover through the Internet, the method comprising:
   receiving, by a source proxy, a connection request from a user equipment (UE) via a source base station;
   establishing a first transport control protocol (TCP) session with an anchor proxy designated for a content server, and transmitting, to the UE, data received from the content server through the first TCP session;
   receiving a handover preparation notification including an IP address of the UE from the source base station while the UE is handed over to a target base station;
   transmitting, to the anchor proxy, session information associated with the first TCP session and information associated with a target proxy related with the target base station;
   transmitting, to the target proxy, the session information associated with the first TCP session;
   in response to a handover start notification being received from the source base station, stopping the first TCP session, and transmitting, to the target proxy, state information associated with data transmitted through the first TCP session,
   wherein data received from the content server is transmitted to the UE connected to the target proxy through a second TCP session by the anchor proxy, after a handover complete notification is transmitted to the anchor proxy from the target proxy, and
   wherein the anchor proxy is configured to bind a context of the first TCP session and a context of the second TCP session between the anchor proxy and the target proxy, and update the context of the first TCP session as the context of the second TCP session varies.

2. The method of claim 1, wherein the anchor proxy is selected based on a predetermined criterion from among proxy caches, each proxy cache having a cost of a connection to the content server that is less than a predetermined threshold value.

3. The method of claim 1, further comprising:
   transmitting, to the target proxy, the context and the session information associated with the first TCP session and the context and the session information associated with the second TCP session associated with the UE in response to the handover start notification being received.

4. The method of claim 1, further comprising:
   transmitting information associated with a file fragment to be taken over through a handover to the target proxy and the anchor proxy in response to the handover start notification being received.

5. The method of claim 1, further comprising:
   connecting, by the anchor proxy, the first TCP session with the source proxy, and transmitting data received from the content server to the UE through the first TCP session;
   receiving, from the source proxy, the session information associated with the first TCP session and the information associated with the target proxy if the UE is handed over from the source proxy to the target proxy;
   stopping, by the anchor proxy, the first TCP session, and establishing the second TCP session with the target proxy; and
   sending, to the target proxy, session information associated with the first TCP session and the second TCP session.

6. The method of claim 5, further comprising:
   overwriting the context of the second TCP session with the context of the first TCP session.

7. The method of claim 5, further comprising:
   receiving, from the source proxy, information associated with a file fragment of which transmission is to be resumed through the second TCP session; and
   resuming transmission of data from the file fragment of which transmission is to be resumed through the second TCP session in response to the handover complete notification being received from a third server.

8. An apparatus in a source proxy capable of supporting a handover through an internet, the apparatus comprising:
   a transceiver;
   and
   a controller configured to:
      receive a connection request at a content server from a user equipment (UE) via a source base station;
      establish a first transport control protocol (TCP) session with an anchor proxy designated for the content server, and transmit to the UE, data received from the content server through the first TCP session;
      receive a handover preparation notification including an IP address of the UE, from the source base station while the UE is handed over to a target base station;
      transmit, to the anchor proxy, session information associated with the first TCP session and information associated with a target proxy related with the target base station;
      transmit, to the target proxy, the session information associated with the first TCP session; and
      stop the first TCP session and transmitting, to the target proxy, state information associated with data being transmitted through the first TCP session in response to a handover start notification being received from the source base station,
   wherein the anchor proxy is configured to bind a context of the first TCP session and a context of a second TCP session between the anchor proxy and the target proxy, and update the context of the first TCP session as the context of the second TCP session varies.

9. The apparatus of claim 8, wherein the anchor proxy is selected, based on a predetermined criterion, from among proxy caches, each proxy cache having a cost of a connection to the content server that is less than a predetermined threshold value.

10. The apparatus of claim 8, wherein the controller is configured to control the transceiver to transmit, to the target proxy, the context and the session information associated with the first TCP session and the context and session information associated with the second TCP session associated with the UE in response to the handover start notification being received.

11. The apparatus of claim 8, wherein the controller is configured to control the transceiver to transmit information associated with a file fragment to be taken over through a handover to the target proxy and a second server in response to the handover start notification being received.

* * * * *